(12) United States Patent
Maeda et al.

(10) Patent No.: US 12,732,072 B2
(45) Date of Patent: Sep. 8, 2026

(54) CORE BLOCK FOR MOTOR, AND METHOD FOR PRODUCING CORE BLOCK FOR MOTOR

(71) Applicant: FANUC CORPORATION, Yamanashi (JP)

(72) Inventors: Takuya Maeda, Yamanashi (JP); Shingo Okada, Yamanashi (JP); Mitsuhiro Yasumura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 544 days.

(21) Appl. No.: 18/261,562

(22) PCT Filed: Feb. 9, 2022

(86) PCT No.: PCT/JP2022/005015
§ 371 (c)(1),
(2) Date: Jul. 14, 2023

(87) PCT Pub. No.: WO2022/172938
PCT Pub. Date: Aug. 18, 2022

(65) Prior Publication Data

US 2024/0079937 A1 Mar. 7, 2024

(30) Foreign Application Priority Data

Feb. 15, 2021 (JP) ................................ 2021-021717

(51) Int. Cl.
*H02K 15/02* (2025.01)
*H02K 1/16* (2006.01)
(Continued)

(52) U.S. Cl.
CPC ............ *H02K 15/021* (2025.01); *H02K 1/16* (2013.01); *B23H 9/02* (2013.01); *B23K 26/361* (2015.10)

(58) Field of Classification Search
CPC .......... H02K 1/16; H02K 15/021; B23H 9/02; B23K 26/361
(Continued)

(56) References Cited

U.S. PATENT DOCUMENTS 10,574,112 B2 * 2/2020 Tomonaga ............... H02K 1/02
11,271,459 B2 * 3/2022 Ushida ................. B23K 26/262
(Continued)

FOREIGN PATENT DOCUMENTS

JP H08-223829 A 8/1996
JP H11-136892 A 5/1999
(Continued)

OTHER PUBLICATIONS

International Search Report issued in PCT/JP2022/005015; mailed Apr. 19, 2022.

*Primary Examiner* — Rashad H Johnson
(74) *Attorney, Agent, or Firm* — Studebaker Brackett PLLC

(57) ABSTRACT

The present invention provides a core block for a motor and a method for producing the core block, which can be efficiently produced and in which the size of a plastic region with poor properties that is formed on an electromagnetic steel sheet of the core block is reduced. This core block for a motor comprises electromagnetic steel sheets laminated on each other, said core block being obtained by carrying out an edge part forming process using electrical energy or optical energy to form the whole or part of the circumferences of edge parts of the electromagnetic steel sheets of the core block and carrying out press working to punch the electromagnetic steel sheets before or after the edge part forming process that uses electrical energy or optical energy.

3 Claims, 19 Drawing Sheets

(51) Int. Cl.
*H02K 15/021* (2025.01)
*B23H 9/02* (2006.01)
*B23K 26/361* (2014.01)

(58) Field of Classification Search
USPC .................................................. 310/216.004
See application file for complete search history.

(56) References Cited

U.S. PATENT DOCUMENTS

| | | | | |
|---|---|---|---|---|
| 2013/0140930 | A1* | 6/2013 | Koka | B60L 15/2009 29/596 |
| 2017/0324295 | A1* | 11/2017 | Tomonaga | H02K 1/02 |
| 2018/0115202 | A1* | 4/2018 | Hirotani | H02K 3/32 |
| 2018/0269731 | A1* | 9/2018 | Ogino | H02K 1/18 |
| 2019/0312473 | A1* | 10/2019 | Ikuta | H02K 11/215 |
| 2019/0372440 | A1* | 12/2019 | Ushida | H02K 1/276 |

FOREIGN PATENT DOCUMENTS

| | | | |
|---|---|---|---|
| JP | H11-220844 | A | 8/1999 |
| JP | 2017-186586 | A | 10/2017 |
| JP | 2020-127344 | A | 8/2020 |

* cited by examiner

CORE BLOCK FOR MOTOR, AND METHOD FOR PRODUCING CORE BLOCK FOR MOTOR

TECHNICAL FIELD

The present invention relates to a core block for a motor, and a method for producing a core block for a motor.

BACKGROUND ART

Conventionally, methods for producing a core block that form a core block for a motor by using press machining to punch an electromagnetic steel sheet are known (for example, refer to Patent Documents 1 and 2).

Patent Document 1: Japanese Unexamined Patent Application, Publication No. H11-136892

Patent Document 2: Japanese Unexamined Patent Application, Publication No. 2020-127344

DISCLOSURE OF THE INVENTION

Problems to be Solved by the Invention

Incidentally, in a case of using press machining to punch an electromagnetic steel sheet as with the production method described in Patent Document 1, although it is possible to efficiently produce a core block for a motor, a fracture surface arises in an electromagnetic steel sheet due to punching using, inter alia, a blade in a press die. FIG. 14 is a cross-sectional view illustrating an electromagnetic steel sheet 10 punched using press machining. In FIG. 14, the electromagnetic steel sheet 10 is punched in the arrow direction. Although it is possible to efficiently shape an electromagnetic steel sheet in a short amount of time using press machining, as illustrated in FIG. 14, a plastic region in which properties have deteriorated due to the press machining is formed in the fracture surface of the electromagnetic steel sheet 10 (the side surface on the left side in FIG. 14). There is a problem that, due to this plastic region, magnetic properties for the electromagnetic steel sheet 10 decrease, and iron loss increases.

An object of the present disclosure is to provide a core block for a motor and a method for producing this core block, which can be efficiently produced and in which the size of a plastic region having deteriorated properties and formed in an electromagnetic steel sheet belonging to the core block for the motor is inhibited.

Means for Solving the Problems

One aspect according to the present disclosure is a core block that is for a motor and includes stacked electromagnetic steel sheets, the core block being achieved by performing edge formation machining using electrical energy or optical energy to form some or an entire perimeter of an edge on the electromagnetic steel sheets in the core block, and performing punching using press machining on the electromagnetic steel sheets before or after the edge formation machining using electrical energy or optical energy.

One aspect according to the present disclosure is a core block that is for a motor and includes stacked electromagnetic steel sheets, the electromagnetic steel sheets being provided with, at some or an entire perimeter of an edge on the electromagnetic steel sheets, an edge formation machining mark section formed by edge formation machining using electrical energy or optical energy, and a punching mark section formed by the electromagnetic steel sheets being punched using press machining.

One aspect according to the present disclosure is a method for producing a core block that is for a motor and includes stacked electromagnetic steel sheets, the method including: edge formation machining using electrical energy or optical energy to form some or an entire perimeter of an edge on the electromagnetic steel sheets in the core block; and punching using press machining on the electromagnetic steel sheets before or after the edge formation machining using electrical energy or optical energy.

Effects of the Invention

By virtue of one aspect according to the present disclosure, it is possible to provide a core block for a motor and a method for producing this core block, which can be efficiently produced and in which the size of a plastic region having deteriorated properties and formed in an electromagnetic steel sheet belonging to the core block for the motor is inhibited.

BRIEF DESCRIPTION OF THE DRAWINGS

FIG. 4B is a plan view that illustrates after FIG. 4A, and illustrates a state that is after edge formation machining using electrical energy or optical energy is performed and before performing press machining;

FIG. 10 is a plan view of a motor core block according to a second variation;

PREFERRED MODE FOR CARRYING OUT THE INVENTION

Description is given below regarding embodiments according to the present disclosure, with reference to the drawings. Note that, in the description for the second embodiment and thereafter as well as each variation, the same reference symbols are added to the same configurations as that in the first embodiment and corresponding reference symbols are added for corresponding configurations, having the same regularity. There are cases where description is omitted or invoked.

First Embodiment

Figure 1:
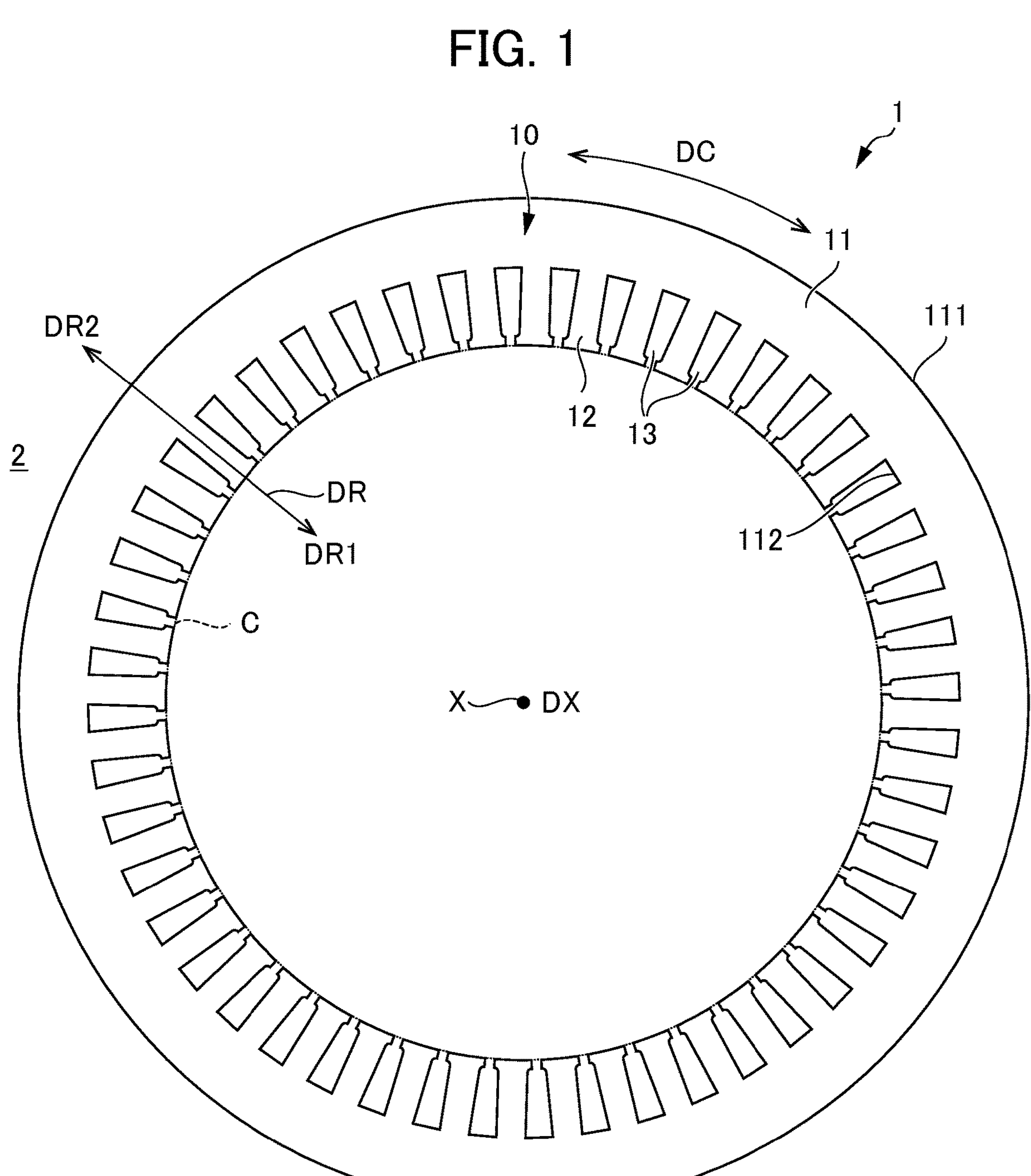
FIG. 1 is a plan view of a motor core block according to a first embodiment.
Figure 2:
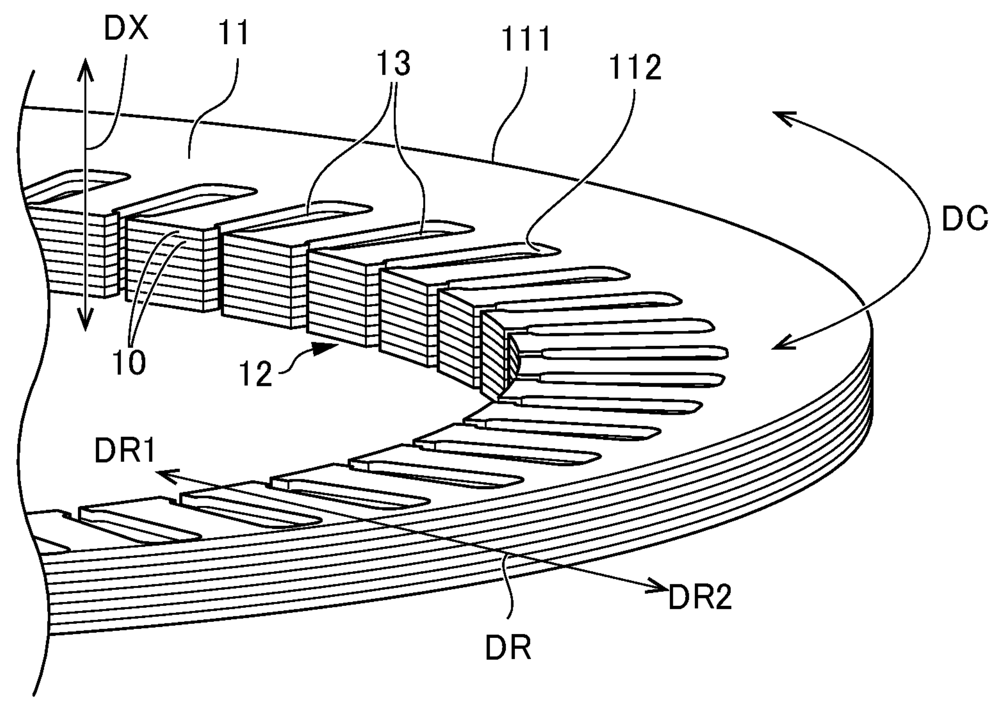
FIG. 2 is a perspective view of a portion of the motor core block according to the first embodiment.
Figure 3:
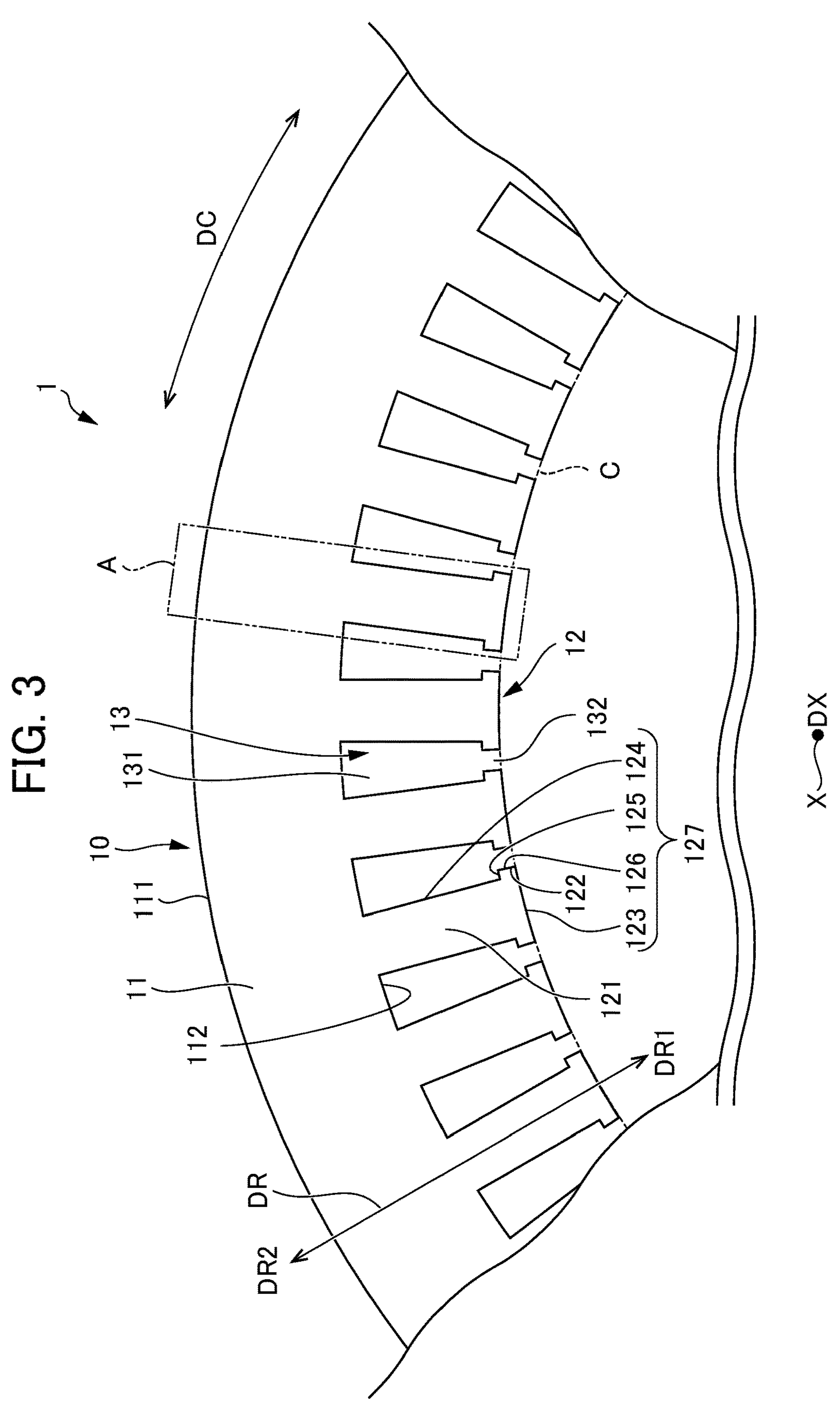
FIG. 3 is a plan view of a portion of the motor core block according to the first embodiment.

With reference to FIG. 1 through FIG. 3, description is given regarding a core block 1 that is for a motor and is according to a first embodiment. FIG. 1 is a plan view for the core block 1, FIG. 2 is a perspective view for a portion of the core block 1, and FIG. 3 is an enlarged plan view for a portion of the core block 1.

The core block 1 is a stator core that is for an induction motor and includes a plurality of annular electromagnetic steel sheets 10 being stacked. Specifically, as illustrated in FIG. 1 and FIG. 2, the core block 1 is configured by the plurality of electromagnetic steel sheets 10 being stacked in an axial direction DX thereof, and joined (secured). The plurality of electromagnetic steel sheets 10 are stacked in the axial direction DX, whereby the core block 1 is configured in an approximately cylindrical shape that has a predetermined wall thickness.

"Approximately cylindrical shape" means having a cylindrical shape when the entirety is viewed and, for example, means that slots 13 may be present between later-described teeth 12. As illustrated in FIG. 1, the core block 1 is fitted into a motor jacket 2 which is a mating member.

FIG. 2 illustrates a state in which eight electromagnetic steel sheets 10 are stacked, but the number of electromagnetic steel sheets 10 included in the core block 1 is not particularly limited.

Here, the axial direction DX in the present specification means a direction in which a central axis X extends for any of the core block 1 or later-described core blocks 1A through 1E. A radial direction DR means a radial direction for any of the core blocks 1 through 1E. A radially-inward direction DR1 means a direction that approaches the central axis X of any of the core blocks 1 through 1E along the radial direction DR. A radially-outward direction DR2 means a direction that is opposite to the radially-inward direction DR1 and goes away from the central axis X along the radial direction DR for any of the core blocks 1 through 1E. A circumferential direction DC means a circumferential direction for an annulus formed by the electromagnetic steel sheets 10 in any of the core blocks 1 through 1E and, in other words, is the circumferential direction for a circle centered on the central axis X.

As illustrated in FIG. 1 through FIG. 3, the core block 1 has a core body 11, a plurality of teeth 12, and slots 13 provided between the plurality of teeth 12.

The core body 11 is formed in an annular shape. An outer peripheral surface 111 of the core body 11 is an edge on the electromagnetic steel sheets 10 on the outer peripheral side thereof, and is a site that is fitted with the motor jacket 2. The plurality of teeth 12 are connectedly provided on an inner peripheral surface 112 of the core body 11.

The plurality of teeth 12 are provided to extend from the inner peripheral surface 112 of the core body 11 in the radially-inward direction DR1, as illustrated in FIG. 1. The plurality of teeth 12 are disposed at intervals that are approximately equal to each other, in the circumferential direction DC. In addition, the plurality of teeth 12 are disposed such that tooth tips 123 which are edges thereof on the central axis X side are positioned on one virtual circle C centered on the central axis X. In the present embodiment, 48 teeth 12 are provided in one electromagnetic steel sheet 10.

As illustrated in FIG. 3, a tooth 12 has a base section 121 and two protruding sections 122. The base section 121 has a flat plate shape, and extends from the inner peripheral surface 112 of the core body 11 in the radially-inward direction DR1. The base sections 121 extend in the radially-inward direction DR1 such that the widths thereof orthogonal to the radial direction DR are approximately uniform, seen in axial direction DX. In other words, side wall sections 124, which are edges on both sides of the base section 121 in the circumferential direction DC, are formed approximately parallel to the radial direction DR seen from the axial direction DX.

As illustrated in FIG. 3, the protruding sections 122 are provided on both sides, in the circumferential direction DC, on the ends of the base sections 121 on the central axis X side. The protruding sections 122 protrude from the ends of the base sections 121 so as to be close to adjacent teeth 12 in the circumferential direction DC. A side wall section 125 which is an edge on a protruding section 122 on the radially-outward direction DR2 side extends from the base section 121 in a direction orthogonal to the radial direction DR, seen from the axial direction DX. Side wall sections 126, which are edges on both sides of the protruding sections 122 in the circumferential direction DC, extend approximately parallel to the radial direction DR seen from the axial direction DX.

The tooth tip 123 of a tooth 12 includes the edge on the base sections 121 on the central axis X side, and edges of the protruding sections 122 on the central axis X side. In other words, the tooth tips 123 are the edge on the core block 1 on the inner peripheral side, and form one facing surface for forming a gap section in the motor. The gap section in the motor is a clearance between a facing surface in the stator core with respect to a rotor core and a facing surface in the rotor core with respect to the stator core. The tooth tips 123 are formed to be positioned on the one virtual circle C centered on the central axis X and curve into protrusions facing the radially-outward direction DR2 seen from the axial direction DX. A tooth tip 123 together with side wall sections 124 through 126 are referred to as edges 127 of the entirety of a tooth 12.

A slot 13 is a hole formed between adjacent teeth 12 in the circumferential direction DC. The slot 13 extends in the radial direction DR, is open in the radially-inward direction DR1, and extends along the axial direction DX of the core block 1 in which the plurality of electromagnetic steel sheets 10 are stacked. In the present embodiment, 48 slots 13 are provided in one electromagnetic steel sheet 10. The 48 slots 13 are disposed at equal intervals with respect to each other in the circumferential direction DC.

A slot 13 has a first slot section 131 and a first opening section 132. The first slot section 131 is a space that is substantially surrounded by the inner peripheral surface 112 of the core body 11, and the side wall sections 124 and 125 of two teeth 12 that are adjacent in the circumferential direction DC. The first slot section 131 is formed such that the width thereof in the circumferential direction DC narrows following the radially-inward direction DR1.

The first opening section 132 is provided between respective side wall sections 126 of teeth 12 that are adjacent in the circumferential direction DC. As illustrated in FIG. 3, the width of the first opening section 132 in the circumferential direction DC is narrower than the width of the first slot section 131 in the circumferential direction DC.

In the present embodiment, an electromagnetic steel sheet 10 has 48 teeth 12 and 48 slots 13. However, the number of teeth 12 and slots 13 provided in an electromagnetic steel sheet 10 is not limited to 48.

In addition, an electromagnetic steel sheet 10 in the core block 1 is provided with, at some or the entire perimeter of an edge thereof, an edge formation machining mark section 20 formed by edge formation machining using electrical energy or optical energy (may be referred to as simply "edge formation machining" below), and a punching mark section 30 formed by the electromagnetic steel sheet 10 being punched using press machining. Note that details for the edge formation machining mark section 20 and the punching mark section 30 are described below together with the method for producing the core block 1.

Figure 4A:
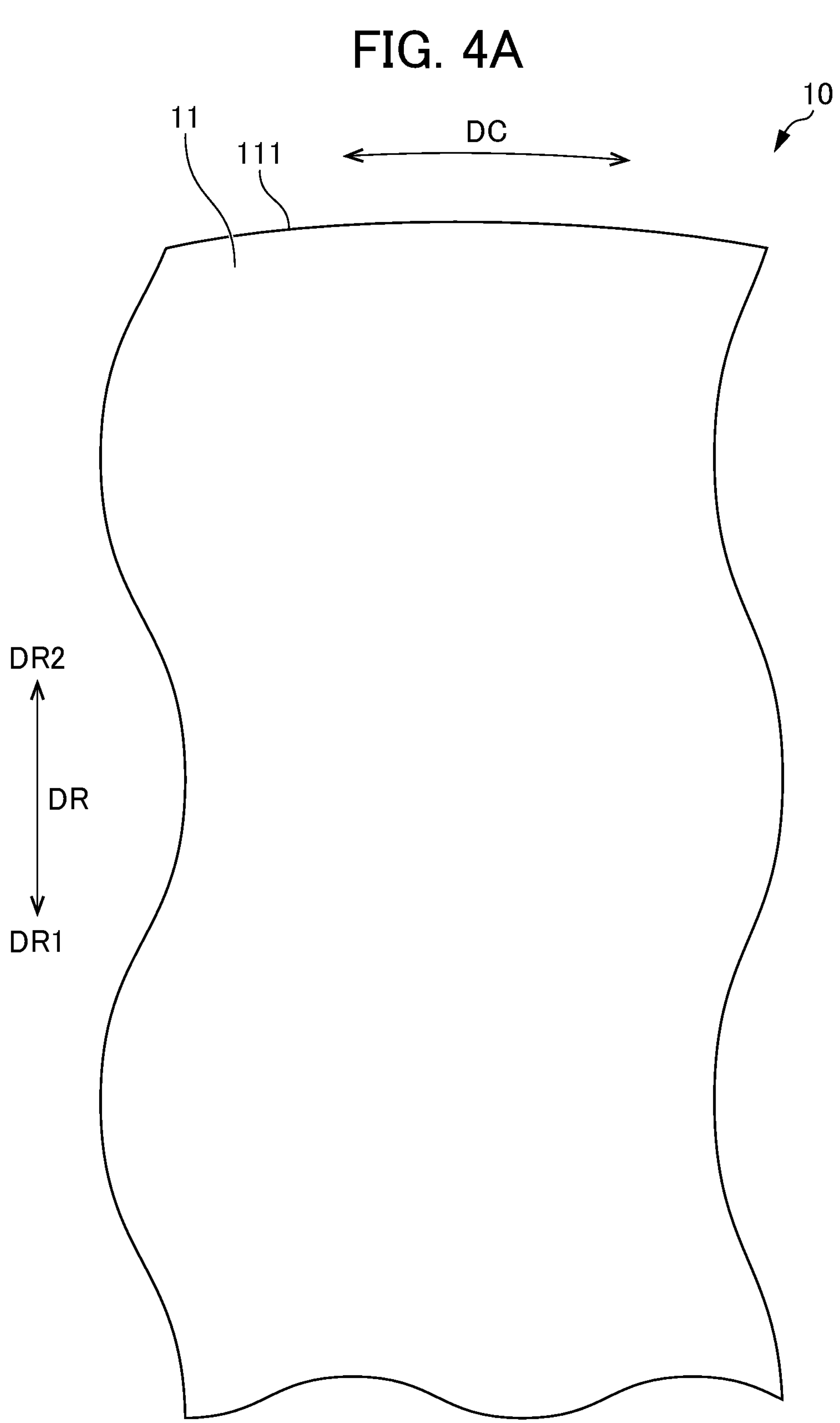
FIG. 4A is a plan view of a portion of the core block according to the first embodiment partway through production.
Figure 4B:
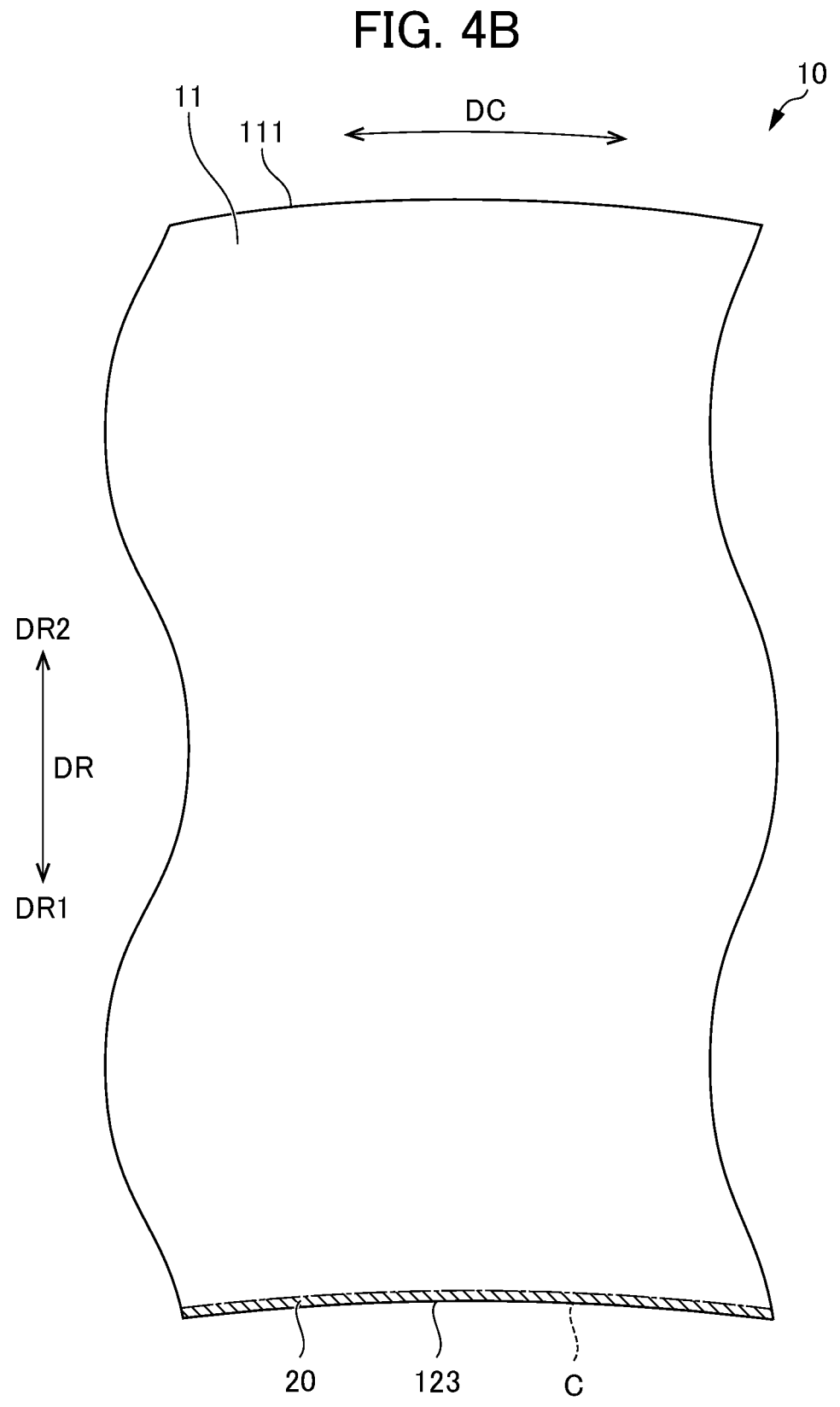
Figure 4C:
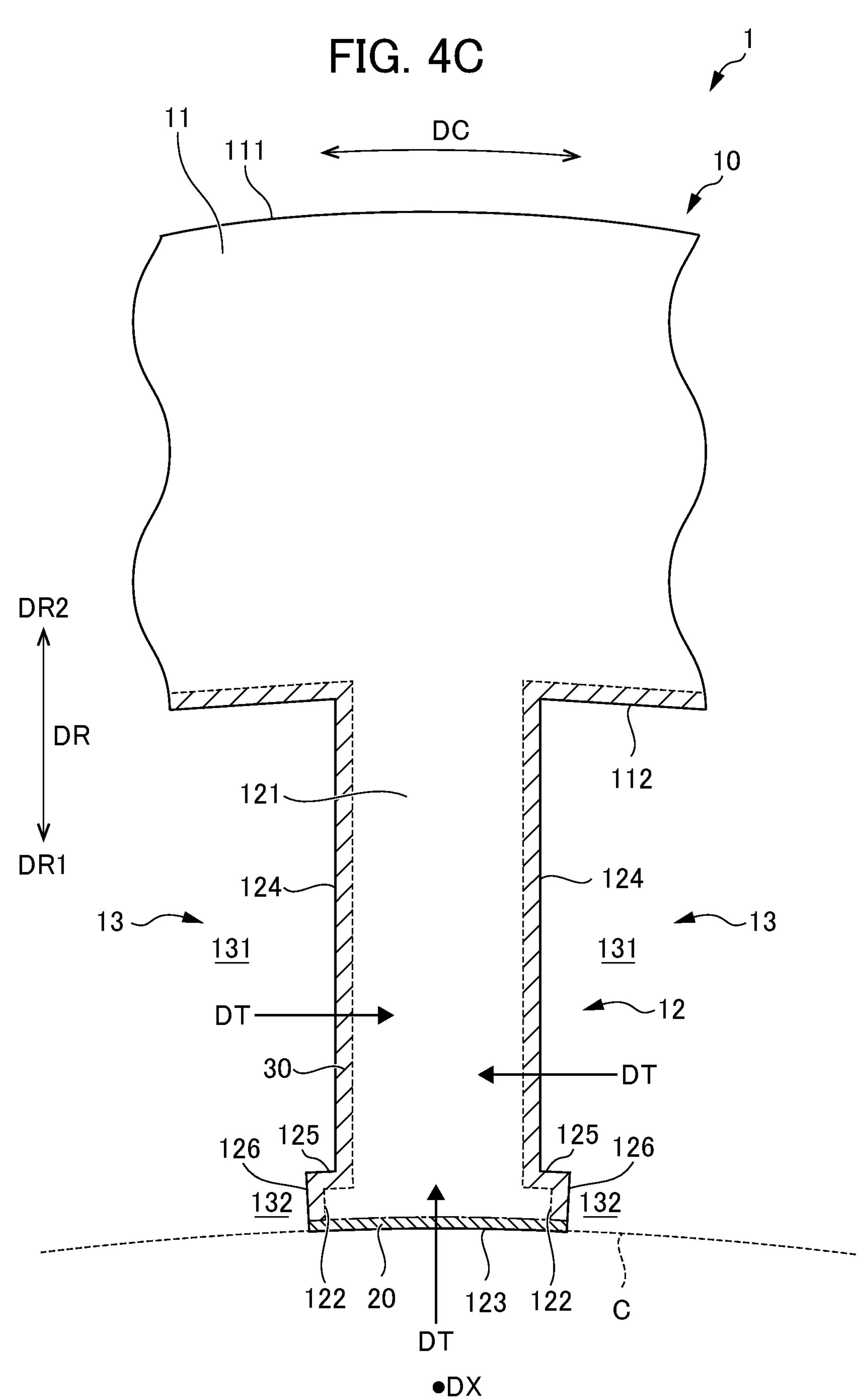
FIG. 4C is a plan view that illustrates after FIG. 4B.

Next, with reference to FIG. 4A through FIG. 4C, description is given regarding a method for producing the core block 1 according to the first embodiment. FIG. 4A is an enlarged plan view of the core block 1 partway through production, for a region A that is illustrated in FIG. 3 surrounded by a double-dotted line. FIG. 4B is an enlarged plan view illustrating after FIG. 4A for the region A illustrated in FIG. 3, and illustrates a state after edge formation machining is performed and before press machining is performed. FIG. 4C is an enlarged plan view that illustrates after FIG. 4B for the region A illustrated in FIG. 3. Note that, for convenience, FIG. 4B illustrates while exaggerating dimensions for the edge formation machining mark section 20 to be larger than actual dimensions, and FIG. 4C illustrates while exaggerating dimensions for the edge formation machining mark section 20 and the punching mark section 30 to be larger than actual dimensions.

The method for producing the core block 1 includes an edge formation machining step for performing edge formation machining to form some or the entire perimeter of the edge on an electromagnetic steel sheet 10 for the core block 1, and a punching step for using press machining to perform punching after the edge formation machining step.

Firstly, in the edge formation machining step, edge formation machining is performed with respect to a disc-shaped electromagnetic steel sheet 10 that is partway through production and is illustrated in FIG. 4A. The edge formation machining is performed using, for example, an apparatus (illustration omitted) configured by an NC apparatus which is a control apparatus, a feeding motor, and a machining power supply. Specifically, the NC apparatus and the feeding motor are used to accurately position a location in the electromagnetic steel sheet 10 to machine, and machining that irradiates the electromagnetic steel sheet 10 with electrons or light based on electrical energy from the machining power supply is performed.

For example, electrical discharge machining such as die-milling electrical discharge machining or wire electrical discharge machining may be given as edge formation machining that uses electrical energy. For example, laser processing such as Galvano laser processing may be given as edge formation machining that uses optical energy. Die-milling electrical discharge machining is desirable from a perspective of establishing both of machining efficiency and machining accuracy. Edge formation machining is for forming an edge itself, and does not include so-called deburring machining.

In the present embodiment, die-milling electrical discharge machining is used to form tooth tips 123 for the teeth 12 in the electromagnetic steel sheet 10. Specifically, an electric discharge is caused while causing an electrode (illustration omitted) having a cylindrical edge having the same diameter as the diameter of the virtual circle C to approach the center of the electromagnetic steel sheet 10 before production. A portion of the electromagnetic steel sheet 10 melts due to the electric discharge from the electrode, whereby a through hole for the virtual circle C is formed in the center of the electromagnetic steel sheet 10. As a result, as illustrated in FIG. 4B, the tooth tips 123 having the edge formation machining mark section 20 are formed by the die-milling electrical discharge machining.

Next, in the punching step, punching using press machining is performed on the electromagnetic steel sheet 10 on which the edge formation machining illustrated in FIG. 4B has been performed. A type of press machining is not particularly limited. For example, punching machining using a die may be given as press machining.

In the present embodiment, punching using a die is performed on a portion in the electromagnetic steel sheet 10 to which edge formation machining has not been performed in order to form a portion or the entire perimeter for the edge on the electromagnetic steel sheet 10 for the core block 1. Specifically, punching is performed using a press die (illustration omitted) that is capable of forming the plurality of slots 13, which extend from the edge formation machining mark section 20 of the electromagnetic steel sheet 10 illustrated in FIG. 4B in the radially-outward direction DR2. As a result, as illustrated in FIG. 4C, the plurality of slots 13 and the inner peripheral surface 112 and side wall sections 124 through 126, which have the punching mark section 30, are formed. The edge formation machining mark section 20 and the punching mark section 30 are not adjacent in a direction DT which is orthogonal to the direction in which the edge on the electromagnetic steel sheet 10 extends and the thickness direction (axial direction DX) of the electromagnetic steel sheet 10.

Here, press machining applies mechanical force by causing the press die to come into direct contact with an artifact to be machined, and thus can shape the electromagnetic steel sheet 10 in a short amount of time. However, press machining has lower machining accuracy than edge formation machining, and a plastic region in which properties have deteriorated is unfortunately formed in a cut surface. Regarding deterioration of properties, for example, there is a case where there is deterioration past original physical properties, or a case in which there is large error in comparison to original shape dimensions. Such deterioration causes the magnetic properties of the electromagnetic steel sheet 10 to decrease, causes iron loss to increase, and consequently causes the performance of the motor to decrease. In contrast to this, in comparison to press machining, edge formation machining has a longer amount of machining time, has higher machining accuracy, and can suppress the formation of a plastic region in a cut surface.

By virtue of the present embodiment, because it is possible to use edge formation machining which has high machining accuracy to form the tooth tips 123, which are sites that are to be a gap section at which the flow of magnetic flux is likely to be disordered, it is possible to reduce iron loss. In addition, sites, which are not a gap section and which include the side wall sections 124 through 126 for teeth 12, are formed using press machining which has a shorter amount of machining time than edge formation machining. Accordingly, it is possible to efficiently produce the core block 1 while suppressing iron loss.

Next, description is given regarding a magnetic measurement test for an electromagnetic steel sheet formed using edge formation machining and an electromagnetic steel sheet formed using press machining. The magnetic measurement test is performed using the following method.

Firstly, an electromagnetic steel sheet is punched using press machining that uses a press die, and a stator core (hereinafter, sample A) that has a sheet width of 8.65 mm and a core body, teeth and slots as with the core block 1 is manufactured. A coil (winding) was wound onto the sample A, a magnetic measurement was performed, and magnetic properties such as the magnetic flux density (T) or iron loss (W/kg) for the sample A were obtained. In addition, an electromagnetic steel sheet was cut using wire electrical discharge machining to manufacture a rectangular test piece (sample B) having a sheet width of 30 mm. Magnetic properties such as the magnetic flux density (T) or iron loss (W/kg) for the sample B were obtained in compliance with the Epstein test method stipulated in JIS C 2550. Iron loss was measured by designating frequencies of 50 Hz, 100 Hz, 400 Hz, and 1000 Hz.

Figure 5:
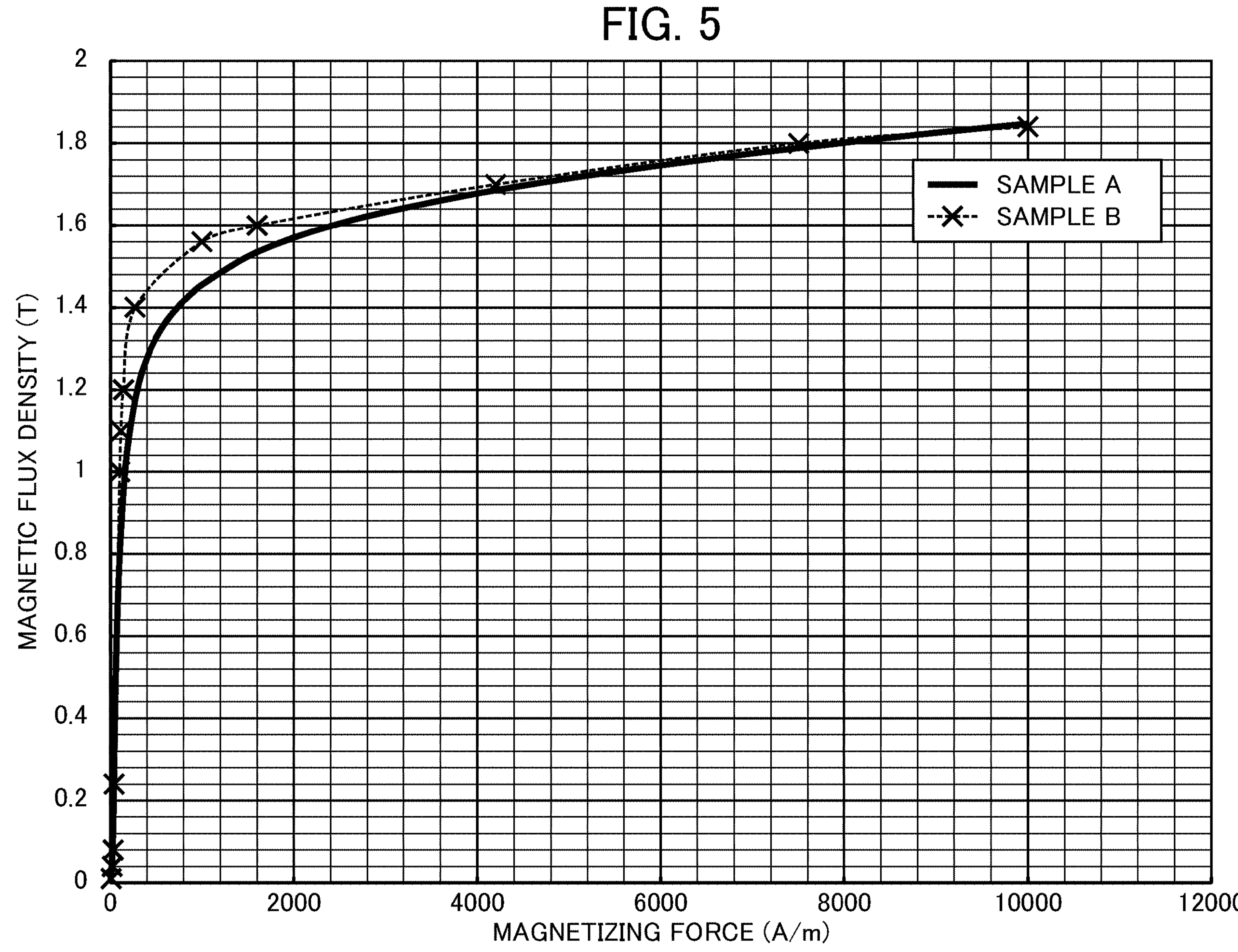
FIG. 5 is a graph that illustrates B-H curves for a core block shaped using only press machining and an electromagnetic steel sheet test piece shaped using only edge formation machining in accordance with electrical energy or optical energy.
Figure 6:
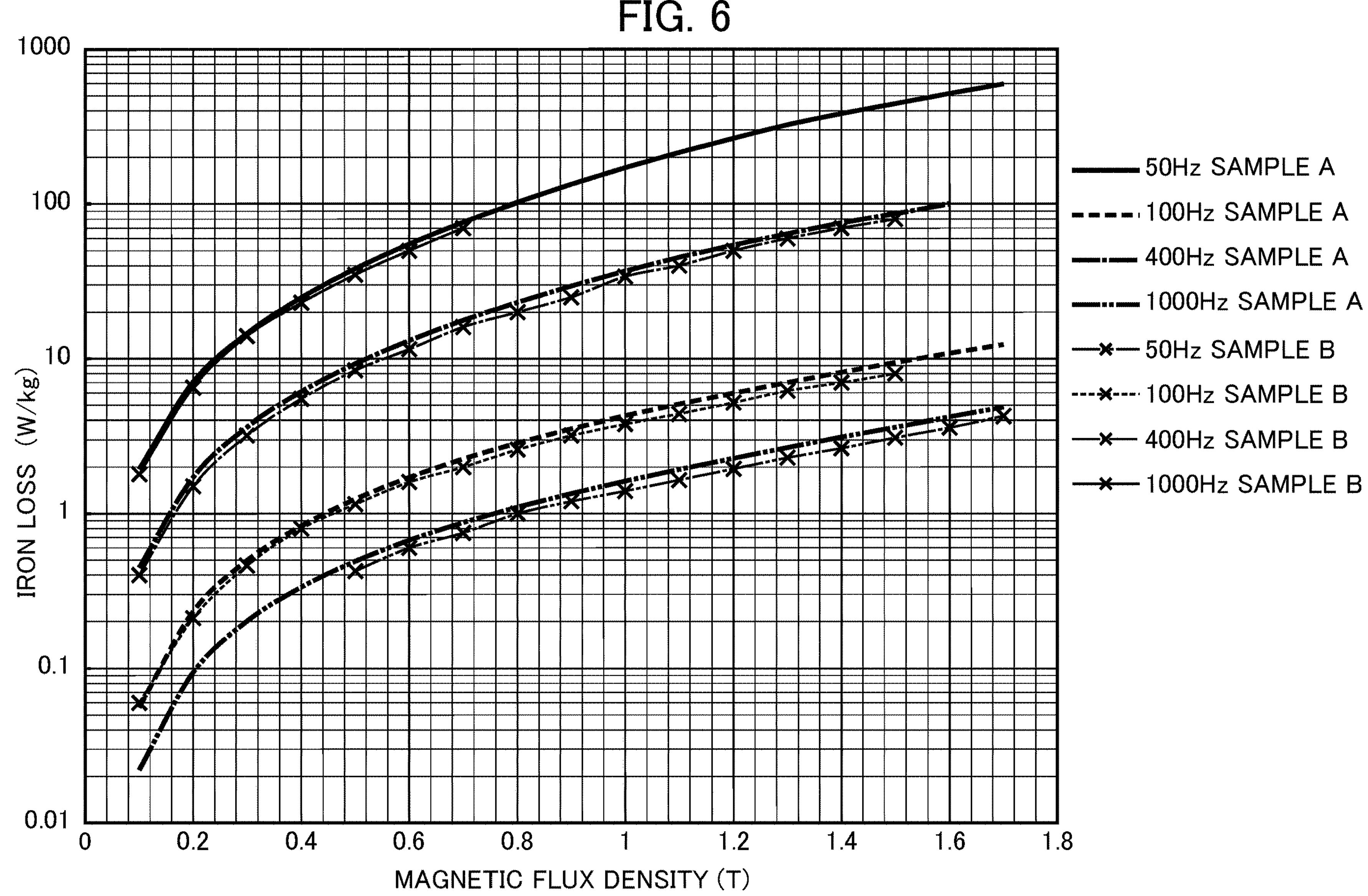
FIG. 6 is a graph that illustrates relationships between iron loss and magnetic flux density for the core block shaped using only press machining and the electromagnetic steel sheet test piece shaped using only edge formation machining in accordance with electrical energy or optical energy.

FIG. 5 is a graph that illustrates the relationship between magnetizing force (A/m) and magnetic flux density (T) for the sample A and the sample B. FIG. 6 is a graph that illustrates the relationship between iron loss (W/kg) and magnetic flux density (T), for each frequency, for the sample A and the sample B. Note that the vertical axis in FIG. 5 indicates magnetic flux density (T) and the horizontal axis indicates magnetizing force (A/m). The vertical axis in FIG. 6 indicates iron loss (W/kg), and the horizontal axis indicates magnetic flux density (T).

As illustrated in FIG. 5, in comparison to the sample B, it was confirmed that, for the sample A which was subjected to press machining, the magnetic flux density was greatly decreased and torque in the motor was less at a magnetizing force of equal to or less than 2000 A/m. In addition, as illustrated in FIG. 6, for all four frequencies, increased iron loss and overall deterioration for iron loss characteristics was confirmed for the sample A which was subjected to press machining, in comparison to the sample B. It was confirmed that the impact on torque or iron loss characteristics for a portion that was machined using press machining was comparatively larger than the impact on a portion machined using wire electrical discharge machining. It is considered that this is influenced by the plastic region which is formed due to press machining.

By virtue of the present embodiment, the following effects are achieved. The core block 1 according to the present embodiment is a motor core block 1 that is configured by electromagnetic steel sheets 10 being stacked, and is achieved by performing edge formation machining using electrical energy or optical energy to form some or the entire perimeter of an edge on the electromagnetic steel sheets 10 in the core block 1, and performing punching using press machining on the electromagnetic steel sheets 10 before or after the edge formation machining which uses electrical energy or optical energy.

As a result, because the core block 1 is achieved using both of edge formation machining which can suppress the formation of a plastic region in which properties have deteriorated and press machining which enables machining in a shorter amount of time, the core block 1 can be efficiently produced while suppressing the size at which a plastic region is formed.

In addition, for the core block 1 according to the present embodiment, motor sites where edge formation machining using electrical energy or optical energy is performed in order to form some or the entire perimeter of the edge on the electromagnetic steel sheets 10 in the core block 1 are the tooth tips 123 in the stator core which are to be a gap section in the motor.

As a result, because the tooth tips 123, which are sites that are to be a gap section where the flow of magnetic flux is likely to be disordered, are machined using edge formation machining that enables the formation of a plastic region to be suppressed, the core block 1 can suppress iron loss. In addition, because press machining is used to machine portions other than the tooth tips 123, it is possible to establish both of an effect of suppressing iron loss and efficiency of production.

Second Embodiment

Next, description is given for a second embodiment according to the present disclosure while invoking the description for the first embodiment which is described above.

Similarly to the core block 1 according to the first embodiment, a core block 1A according to the second embodiment is a stator core that is for an induction motor and is configured by a plurality of annular electromagnetic steel sheets 10 being stacked. The method for producing the core block 1A and positions of an edge formation machining mark section 20 and a punching mark section 30 in the core block 1A are different to that for the core block 1. Accordingly, description that overlaps with that for the core block 1 is omitted, and description is given regarding the method for producing the core block 1A and configuration of the edge formation machining mark section 20 and the punching mark section 30.

Figure 7A:
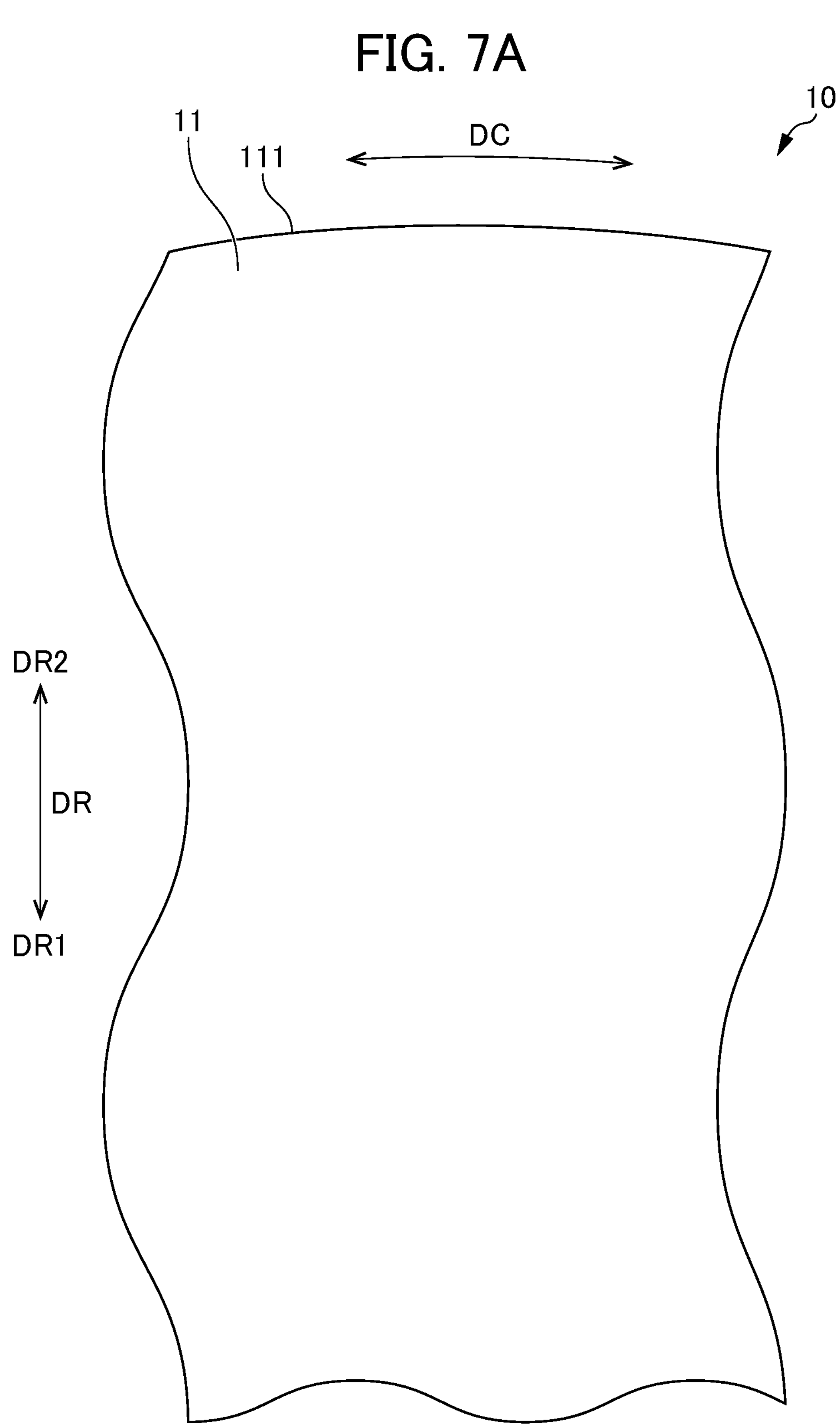
FIG. 7A is a plan view of a portion of a core block according to a second embodiment partway through production.
Figure 7B:
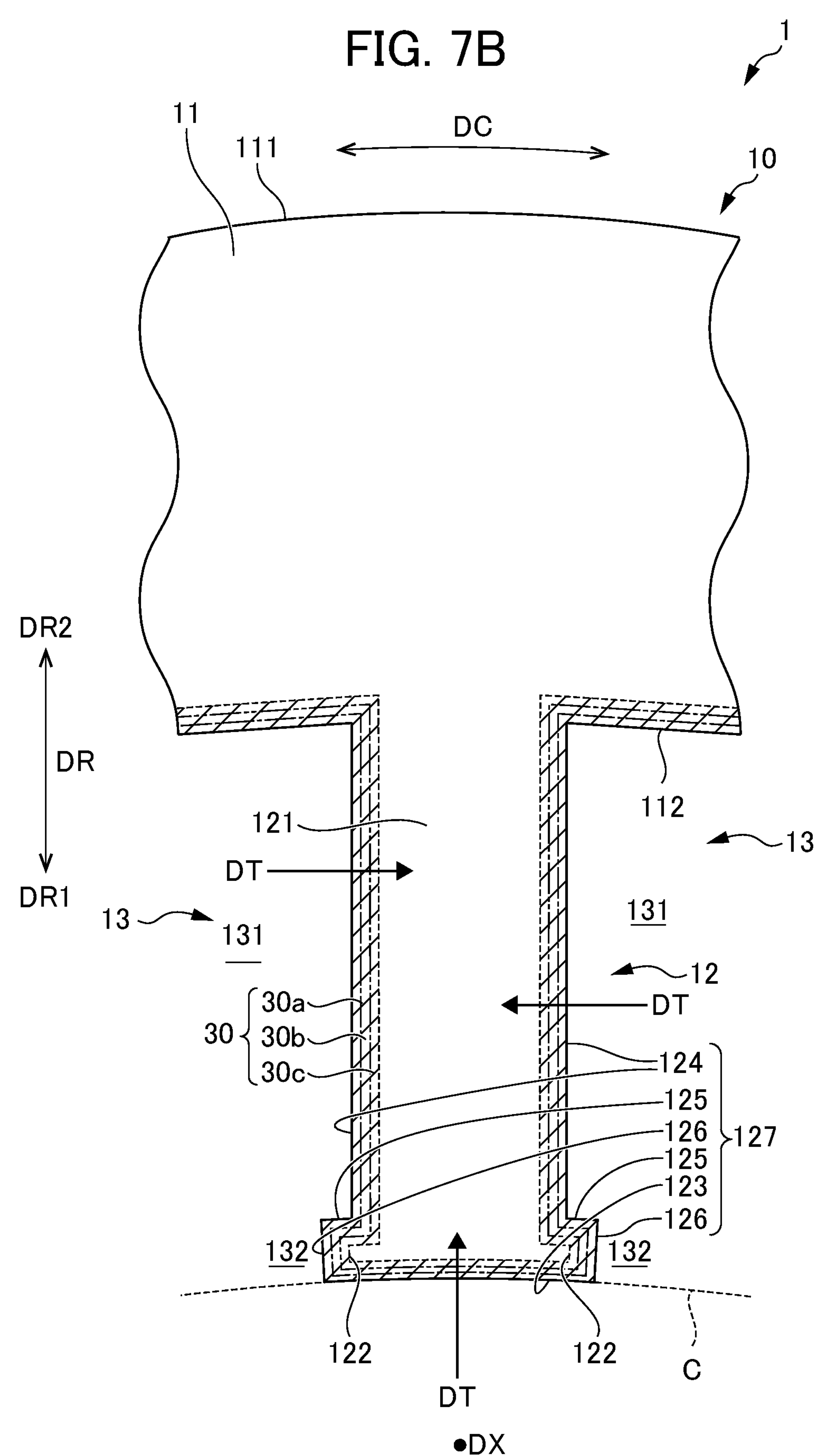
FIG. 7B is a plan view that illustrates after FIG. 7A, and illustrates a state after press machining is performed and before performing edge formation machining using electrical energy or optical energy.
Figure 7C:
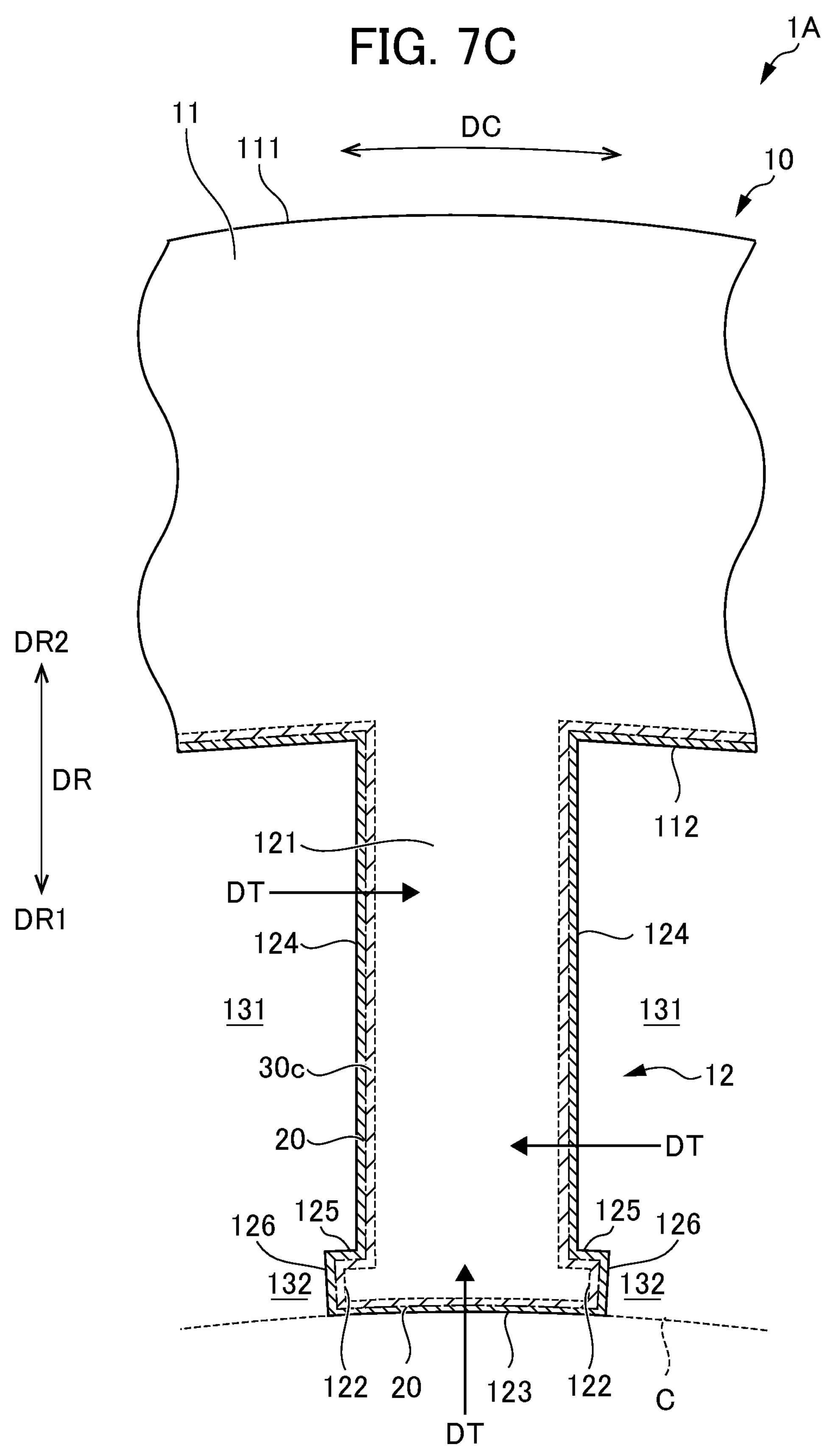
FIG. 7C is a plan view that illustrates after FIG. 7B.
Figure 8A:
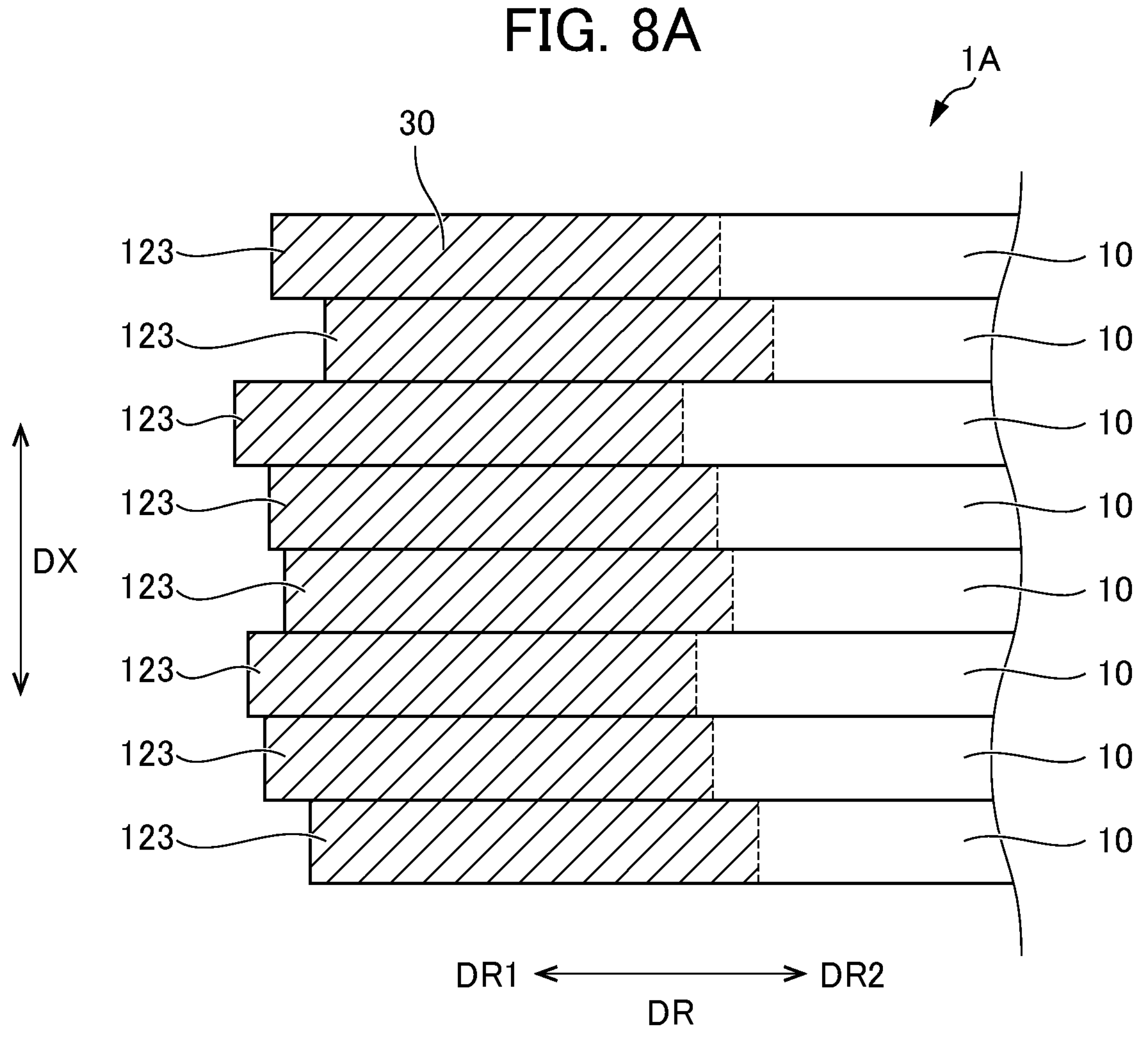
FIG. 8A is a cross-sectional view that illustrates a portion of the core block according to the second embodiment partway through production, and illustrates a state after press machining is performed and before performing edge formation machining using electrical energy or optical energy.
Figure 8B:
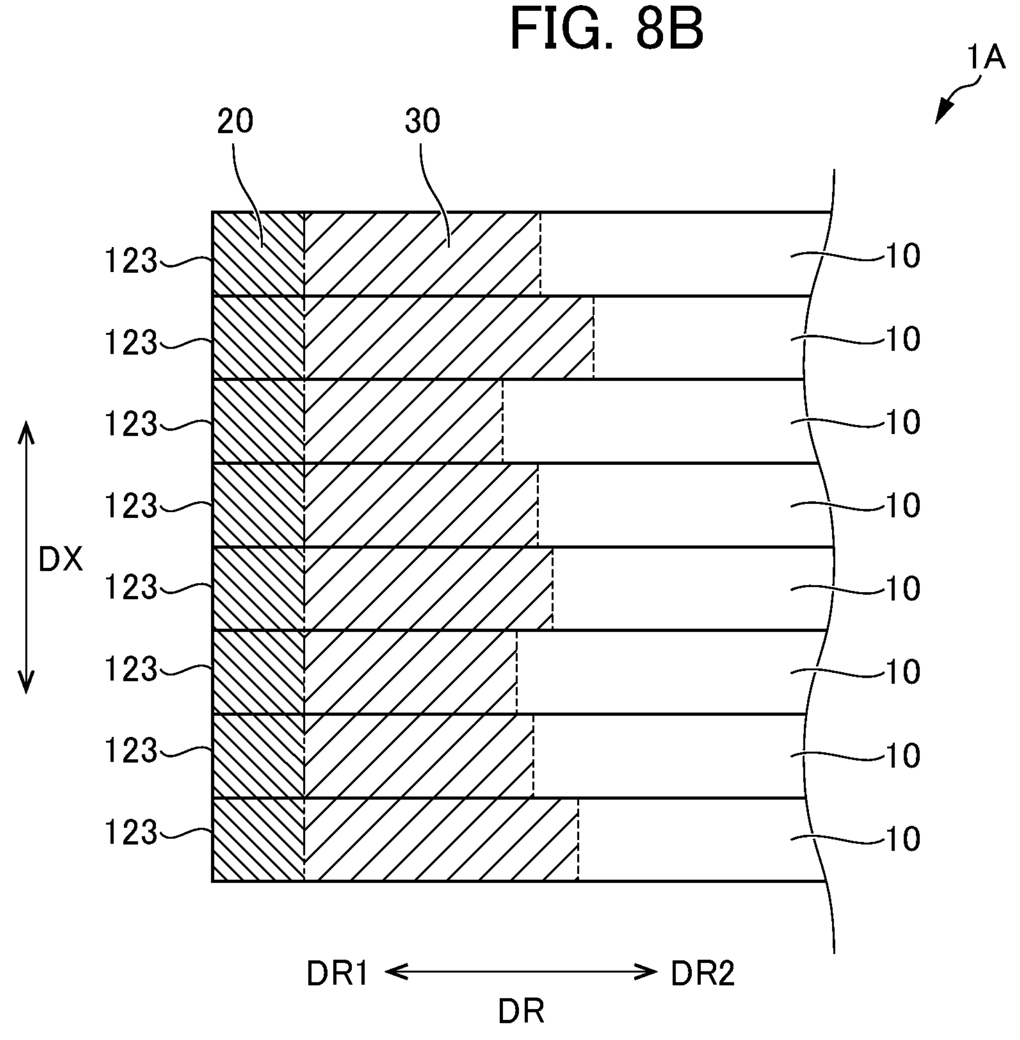
FIG. 8B is a cross-sectional view that illustrates after FIG. 8A.

Next, with reference to FIG. 7A through FIG. 8B, description is given regarding a method for producing the core block 1A according to the second embodiment. FIG. 7A is an enlarged plan view for a site where one tooth 12 in the core block 1A is formed partway through production, and the vicinity of this site. FIG. 7B is an enlarged plan view that illustrates after FIG. 7A, and illustrates a state after press machining is performed and before performing edge formation machining. FIG. 7C is an enlarged plan view that illustrates after FIG. 7B. FIG. 8A is a cross-sectional view that illustrates a portion of the core block 1A partway through production, and illustrates a state after press machining is performed and before performing edge formation machining. FIG. 8B is a cross-sectional view that illustrates after FIG. 8A. Note that, FIG. 7B and FIG. 8A illustrate while exaggerating dimensions for the punching mark section 30 to be larger than actual dimensions, and FIG. 7C and FIG. 8B illustrate while exaggerating dimensions for the edge formation machining mark section 20 and the punching mark section 30 to be larger than actual dimensions.

The method for producing the core block 1A includes an edge formation machining step for performing edge formation machining to form some or the entire perimeter of the edge on an electromagnetic steel sheet 10 for the core block 1, and a punching step for using press machining to perform punching before the edge formation machining step.

In the first embodiment, a motor site where edge formation machining is performed is the tooth tip 123 which is a site that is to be a gap section in the motor, and a site where press machining is to be performed is the side wall sections 124 through 126 in the tooth 12 and the inner peripheral surface 112 of the core body 11. In contrast to this, in the second embodiment, both of edge formation machining and press machining is performed on each of the tooth tip 123 in the tooth 12, the side wall sections 124 through 126 in the tooth 12, and the inner peripheral surface 112 on the core body 11.

Firstly, in the punching step, punching machining using a press die is performed on a disc-shaped electromagnetic steel sheet 10 that is partway through production and is illustrated in FIG. 7A. Specifically, the punching machining is performed using a press die having a shape that can form a through hole, which has a diameter smaller than that of the virtual circle C by a portion removed by the edge formation machining, and a plurality of slots 13 extending from this through hole in the radially-outward direction DR2 and having a size smaller by a portion removed by the edge formation machining. Note that the press die may be something that is integrally configured and can simultaneously form the through hole and the slots 13, or may be something that is configured by a plurality of items and separately (not at the same time) forms the through hole and the slots 13. In other words, the punching machining is performed by providing a machining allowance that corresponds to a portion that is to be removed by the edge formation machining. As a result, as illustrated in FIG. 7B, the inner peripheral surface 112 on the core body 11, the teeth 12, and the slots 13 are formed in a state where the machining allowance is present. The machining allowance is a portion indicated by a first punching mark section 30*a* (described below). It is desirable for the width of the machining allowance to be one to two times the thickness of the electromagnetic steel sheet 10. For example, in a case where the thickness of the electromagnetic steel sheet 10 is 0.5 mm, it is desirable for the machining allowance to be 0.5 mm to 1.0 mm.

As illustrated in FIG. 7B, the punching mark section 30 is formed on the inner peripheral surface 112 of the core body 11 and the edges 127 (a site resulting from combining the tooth tip 123 and the side wall sections 124 through 126), which are fracture surfaces that arise due to the press machining, on the teeth 12. For convenience, the punching mark section 30 can be divided along the direction DT, which is from outside toward the inside of the electromagnetic steel sheet 10 in a direction orthogonal to the thickness direction (axial direction DX) of the electromagnetic steel sheet 10, into three sites—specifically the first punching mark section 30*a*, a second punching mark section 30*b*, and a third punching mark section 30*c*. In FIG. 7B, the boundary between the first punching mark section 30*a* and the second punching mark section 30*b* is indicated by a single-dash line, the boundary between the second punching mark section 30*b* and the third punching mark section 30*c* is indicated by a double-dash line, and the boundary between the third punching mark section 30*c* and a site in the electromagnetic steel sheet 10 where the punching mark section 30 is not formed is indicated by a broken line.

Next, edge formation machining is performed in the edge formation machining step. Specifically, electrical discharge machining or laser processing is used to irradiate electrons or light along the edges 127 of the teeth 12 to thereby form the edge formation machining mark section 20. Specifically, as illustrated in FIG. 7C, due to the edge formation machining, the first punching mark section 30*a* formed as a machining allowance is removed and the second punching mark section 30*b* becomes the edge formation machining mark section 20 for which properties are less likely to change and formation of a plastic region is suppressed. As a result, the (third punching mark section 30*c* of the) punching mark section 30 and the edge formation machining mark section 20 are formed on the entirety of the edges 127 of the teeth 12. Specifically, the edge formation machining mark section 20 is formed at the outermost edge on the tooth tips 123 and side wall sections 124 through 126 of the teeth 12, and the punching mark section 30 is formed at a location adjacent to the edge formation machining mark section 20. In other words, the edge formation machining mark section 20 and the punching mark section 30 are adjacent in the direction DT which is orthogonal to the direction in which the edge on the electromagnetic steel sheet 10 extends and the thickness direction of the electromagnetic steel sheet 10. It is possible to further reduce iron loss because the edge formation machining mark section 20, in which formation of a plastic region is suppressed, is formed on the entirety of the edges 127 of the teeth 12 so as to cover (surround) the punching mark section 30 which has a large plastic region.

In addition, in the edge formation machining step in the present embodiment, it is desirable to perform the edge formation machining to form some or the entire perimeter of edges of the electromagnetic steel sheets 10 in the core block 1A in a state where a plurality of electromagnetic steel sheets 10 for which punching using press machining has been performed have been stacked and secured.

For example, in FIG. 8A, a plurality of electromagnetic steel sheets 10 that have not been subjected to edge formation machining are stacked and secured in a state where the tooth tips 123 are respectively shifted in the radial direction DR. In this state, edge formation machining that radiates electrons or light in the axial direction DX is performed. As a result, as illustrated in FIG. 8B, the edge formation machining mark section 20 at which positions of the tooth tips 123, which are edges in the radially-inward direction DR1, are aligned is formed. In other words, rather than performing edge formation machining on one electromagnetic steel sheet 10 at a time, edge formation machining is collectively performed on a plurality thereof, whereby it is possible to improve the efficiency of producing the core block 1A and more reliably reduce iron loss due to press machining.

By virtue of the present embodiment, the following effects are achieved. The core block 1A according to the present embodiment is achieved by performing edge formation machining using electrical energy or optical energy to form some or the entire perimeter of edges on the electromagnetic steel sheets 10 in the core block 1A, at a portion in the electromagnetic steel sheets 10 where punching using press machining has been performed.

As a result, after the core block 1A is shaped using press machining which has a short amount of machining time although a plastic region is formed, it is possible to use edge formation machining which has high machining accuracy to form edges having high dimensional accuracy while also removing the plastic region that was formed. Accordingly, it is possible to establish both of suppressing the size of the plastic region in the core block 1A and improving efficiency of production.

The core block 1A according to the present embodiment is achieved by performing edge formation machining using electrical energy or optical energy to form some or the entire perimeter of edges on the electromagnetic steel sheets 10 in the core block 1A, in a state where a plurality of the electromagnetic steel sheets 10 for which punching using press machining has been performed are stacked and secured.

As a result, because the edge formation machining is performed collectively for a plurality of the electromagnetic steel sheets 10, efficiency for producing the core block 1A is further improved.

In addition, for the core block 1A according to the present embodiment, motor sites where edge formation machining using electrical energy or optical energy is performed in order to form some or the entire perimeter of the edge on the electromagnetic steel sheets 10 in the core block 1A are the edges 127 on the teeth 12 in the stator core.

As a result, because the gap section where a strong magnetic flux will flow and the edges 127 on the teeth 12 in the vicinity thereof is caused to be formed by edge formation machining, it is possible to further improve an effect of suppressing iron loss.

In addition, in the method for producing the core block 1A according to the present embodiment, press machining is performed by providing a machining allowance (the first punching mark section 30*a*) corresponding to a portion removed when the core block 1A is subjected to edge formation machining using electrical energy or optical energy.

As a result, the press machining is performed in consideration of the portion removed by the edge formation machining, and thus dimensional accuracy is further improved.

Next, variations resulting from changing the type of the motor core block are described.

[First Variation]

Figure 9:
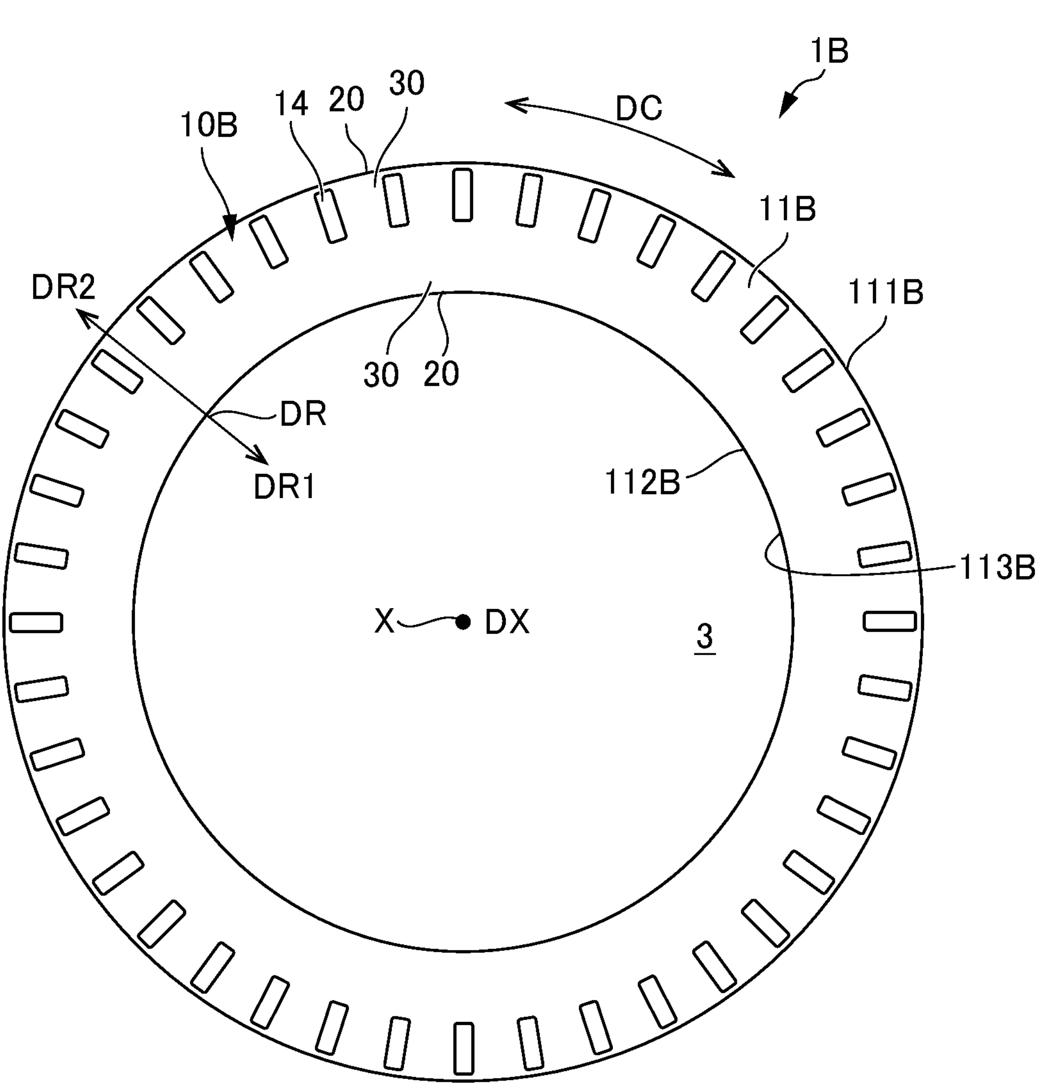
FIG. 9 is a plan view of a motor core block according to a first variation.

With reference to FIG. 9, description is given regarding a core block 1B that is for a motor and is according to a first variation. FIG. 9 is a plan view for the core block 1B.

The core block 1B is a rotor core for an induction motor, and is configured by electromagnetic steel sheets 10B being stacked. The core block 1B is configured by approximately cylindrical electromagnetic steel sheets 10B being stacked. As illustrated in FIG. 9, the core block 1B is fitted onto a shaft 3 which is a mating member.

The electromagnetic steel sheets 10B configuring the core block 1B have a core body 11B and a plurality of slots 14 as illustrated in FIG. 9. The core body 11B is approximately cylindrical, and a through hole 113B into which the shaft 3 is fitted is formed along the central axis X thereof. An inner peripheral surface 112B that is on the core body 11B is an edge on the inner peripheral side of the electromagnetic steel sheets 10B, and is a site onto which the shaft 3 is fitted. An outer peripheral surface 111B on the core body 11B is a facing surface that is adjacent to a stator core such as the core block 1 or the core block 1A, and forms a gap section in the motor.

The slots 14 are holes in the core body 11B that extend in the axial direction DX. The slots 14 are rectangular in a plan view, and are provided on the outer peripheral surface 111B side (radially-outward direction DR2 side) of the core body 11B. In the present embodiment, 40 slots 14 are provided in an electromagnetic steel sheet 10B. The 40 slots 14 are disposed at equal intervals with respect to each other in the circumferential direction DC.

In addition, the electromagnetic steel sheet 10B is provided with an edge formation machining mark section 20 formed using edge formation machining at the entire perimeter of the outer peripheral surface 111B and an inner peripheral surface 112B which are edges of the electromagnetic steel sheet 10B, and a punching mark section 30 formed by the electromagnetic steel sheet 10B being punched by press machining. Note that details for the edge formation machining mark section 20 and the punching mark section 30 are described together with the method for producing the core block 1B.

Next, description is given regarding the method for producing the core block 1B according to the first variation. Similarly to the core block 1A according to the second embodiment, the method for producing the core block 1B includes an edge formation machining step for performing edge formation machining to form the entire perimeter of the edge on an electromagnetic steel sheet 10B for the core block 1B, and a punching step for using press machining to perform punching before the edge formation machining step.

Firstly, in the punching step, punching machining using a die is performed with respect to the electromagnetic steel sheet 10B before production. Specifically, the punching machining is performed using a press die capable of forming the approximately cylindrical core body 11B which has the through hole 113B, and the plurality of slots 14. As a result, the outer peripheral surface 111B, the inner peripheral surface 112B, and the slots 14 which have the punching mark section 30, are formed.

Next, edge formation machining is performed in the edge formation machining step. Specifically, electrical discharge machining or laser processing is used to irradiate electrons or light along the outer peripheral surface 111B and the inner peripheral surface 1128 on the core body 11B to thereby form the edge formation machining mark section 20. Using this edge formation machining, a portion of the punching mark section 30 is removed, and the edge formation machining mark section 20 is formed by changing the physical properties of the portion of the punching mark section 30. As a result, the edge formation machining mark section 20 is formed at the outermost edge on the outer peripheral surface 111B and the inner peripheral surface 112B, and the punching mark section 30 is formed at a location adjacent to the edge formation machining mark section 20. In other words, the edge formation machining mark section 20 and the punching mark section 30 are adjacent in a direction which is orthogonal to the direction in which the edge on the electromagnetic steel sheet 10B extends and the thickness direction (axial direction DX) of the electromagnetic steel sheet 10B. As a result, after the core block 1B is shaped using press machining which has a short amount of machining time, the outer peripheral surface 111B that is a site to be a gap section in the motor at which the flow of magnetic flux is likely to be disordered is machined using edge formation machining which has high machining accuracy, and thus it is possible to establish both iron loss suppression and production efficiency.

In the present variation, a motor site, at which edge formation machining using electrical energy or optical energy is performed in order to form the entire perimeter of the edges on the electromagnetic steel sheets 10B in the core block 1B, is the inner peripheral surface 112B on a circular site into which the shaft 3 is fitted.

As a result, dimensional accuracy improves for the inner peripheral surface 112B which is on the core block 1B and onto which the shaft 3 is fitted, and stress due to fitting onto the shaft 3 becomes less likely to occur.

[Second Variation]

Figure 10:
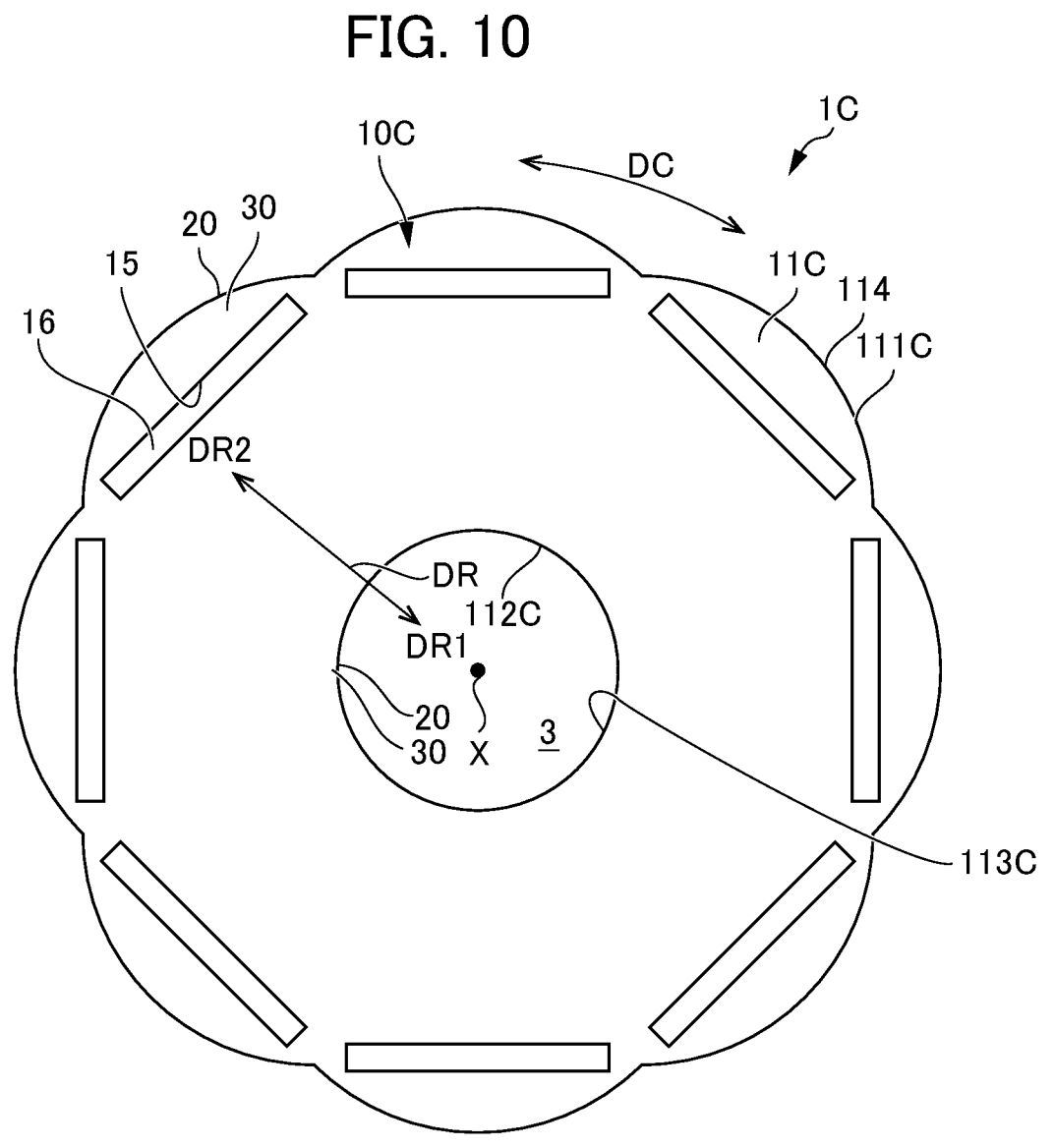

With reference to FIG. 10, description is given regarding a core block 1C that is for a motor and is according to a second variation. FIG. 10 is a plan view for the core block 1C.

The core block 1C is a rotor core for a servomotor (synchronous motor) configured by electromagnetic steel sheets 10C being stacked. The core block 1C is configured by approximately cylindrical electromagnetic steel sheets 10C being stacked. As illustrated in FIG. 9, the core block 1C is fitted onto a shaft 3 which is a mating member.

The electromagnetic steel sheets 10C configuring the core block 1C have a core body 11C, a plurality of slots 15, and a plurality of magnets 16, as illustrated in FIG. 10. The core body 11C is approximately cylindrical, and a through hole 113C into which the shaft 3 is fitted is provided along a central axis X thereof. An inner peripheral surface 112C that is on the core body 11C is an edge on the inner peripheral side of the electromagnetic steel sheets 10C, and is a site onto which the shaft 3 is fitted. An outer peripheral surface 111C on the core body 11C is a facing surface that is adjacent to a stator core such as the core block 1 or the core block 1A, and forms a gap section in the motor.

A plurality of protruding surfaces 114 are provided on the outer peripheral surface 111C on the core body 11C. The protruding surfaces 114 are formed into arc shapes that protrude in the radially-outward direction DR2 in the plan view. In the present embodiment, eight protruding surfaces 114 are contiguously disposed.

The slots 15 are holes in the core body 11C that extend in the axial direction DX. The slots 15 are rectangular in a plan view, and are provided on the outer peripheral surface 111C side (radially-outward direction DR2 side) of the core body 11C. In the present embodiment, eight slots 15 are provided in the electromagnetic steel sheets 10C at locations corresponding to the protruding surfaces 114. The eight slots 15 are disposed at equal intervals with respect to each other in the circumferential direction DC.

The magnets 16 are respectively inserted into the eight slots 15. In a plan view, the magnets 16 have a rectangular shape that can be inserted into the slots 15.

In addition, each electromagnetic steel sheet 10C is provided with an edge formation machining mark section 20 formed using edge formation machining at the entire perimeter of the outer peripheral surface 111C and an inner peripheral surface 112C which are edges of the electromagnetic steel sheet 10C, and a punching mark section 30 formed by the electromagnetic steel sheet 10C being punched by press machining. Specifically, the edge formation machining mark section 20 is formed at the outermost edge on the outer peripheral surface 111C, and the punching mark section 30 is formed at a location adjacent to the edge formation machining mark section 20. The edge formation machining mark section 20 is formed at the outermost edge on the inner peripheral surface 112C, and the punching mark section 30 is formed at a location adjacent to the edge formation machining mark section 20. In addition, the edge formation machining mark section 20 and the punching mark section 30 are adjacent in a direction which is orthogonal to the direction in which the edge on the electromagnetic steel sheet 10C extends and the thickness direction (axial direction DX) of the electromagnetic steel sheet 10C. As a result, after the core block 1C is shaped using press machining which has a short amount of machining time, the outer peripheral surface 111C that is a site to be a gap section at which the flow of magnetic flux is likely to be disordered is machined using edge formation machining which has high machining accuracy, and thus it is possible to establish both iron loss suppression and production efficiency. Note that the core block 1C is produced by a method similar to that for the core block 1B.

[Third Variation]

Figure 11:
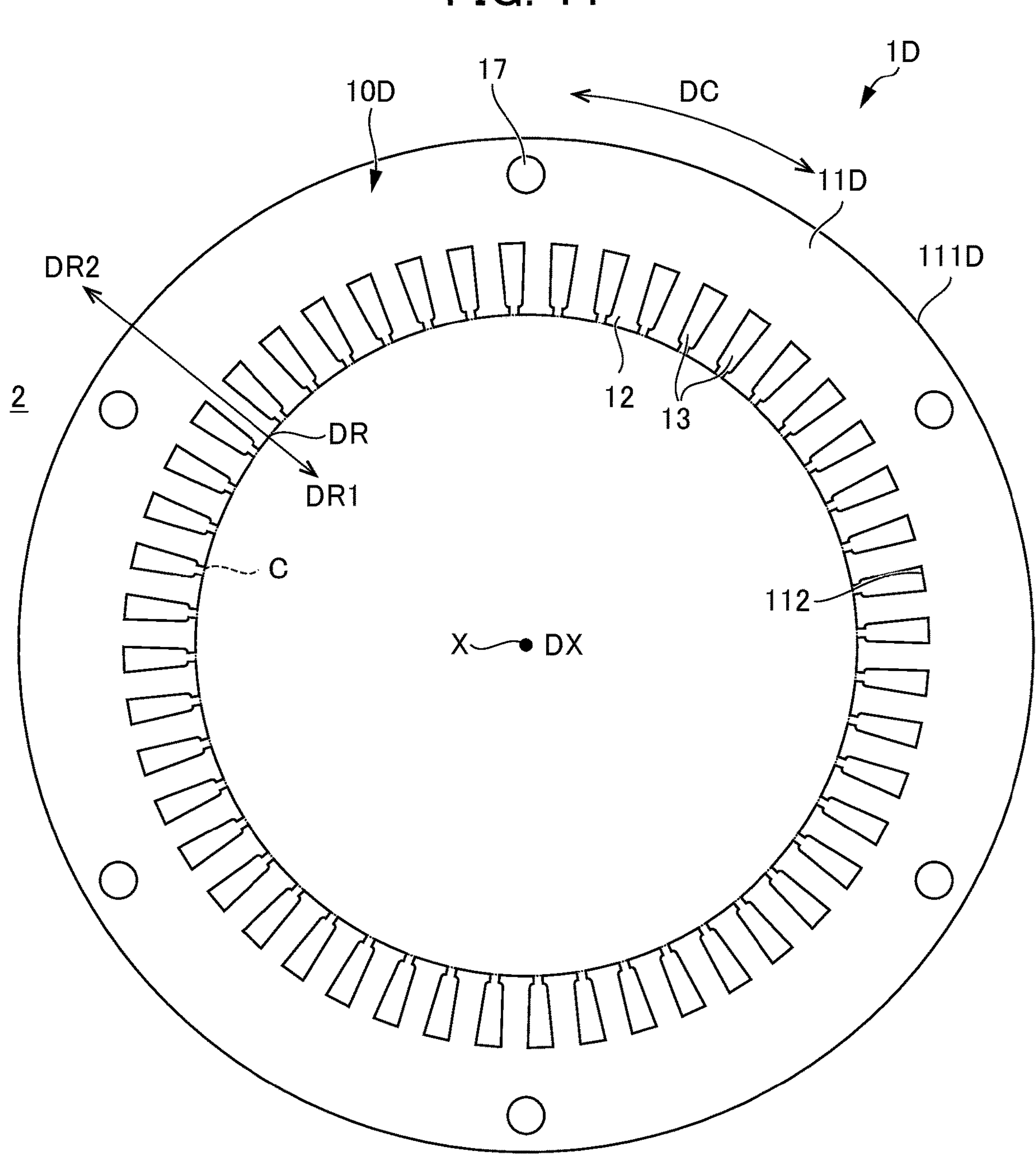
FIG. 11 is a plan view of a motor core block according to a third variation.

With reference to FIG. 11, description is given regarding a core block 1D that is for a motor and is according to a third variation. FIG. 11 is a plan view for the core block 1D.

Similarly to the core block 1A according to the second embodiment, the core block 1D is a stator core that is for an induction motor and is configured by a plurality of annular electromagnetic steel sheets 10 being stacked. For the core block 1D, the configuration of a core body 11D differs to that in the core block 1A. Specifically, electromagnetic steel sheets 10D have a plurality of securing holes 17 which are used when the electromagnetic steel sheets 10Ds are secured in a stacked state for a time of edge formation machining with respect to the core body 11D.

The securing holes 17 penetrate in the thickness direction (axial direction DX) of the electromagnetic steel sheets 10D. The plurality of securing holes 17 are disposed at intervals that are approximately equal to each other in the circumferential direction DC, on the outer peripheral surface 111 side (radially-outward direction DR2 side) of the core body 11. In the present embodiment, six securing holes 17 are provided. All of the electromagnetic steel sheets 10D that configure the core block 1D have securing holes 17 at respectively the same positions.

The securing holes 17 are used when stacking and securing the plurality of electromagnetic steel sheets 10D in edge formation machining. Specifically, the plurality of electromagnetic steel sheets 10D, which have been subjected to press machining, are stacked such that the securing holes 17 respectively formed therein overlap, and rod-like members (illustration omitted) are inserted into the securing holes 17. Edge formation machining is performed on the plurality of electromagnetic steel sheets 10 in a state where the rod-like members have been inserted into respective securing holes 17. As a result, during edge formation machining, it is possible to perform securing such that the stacked plurality of electromagnetic steel sheets 10D do not shift with respect to each other, and it is possible to easily perform edge formation machining.

[Fourth Variation]

Figure 12:
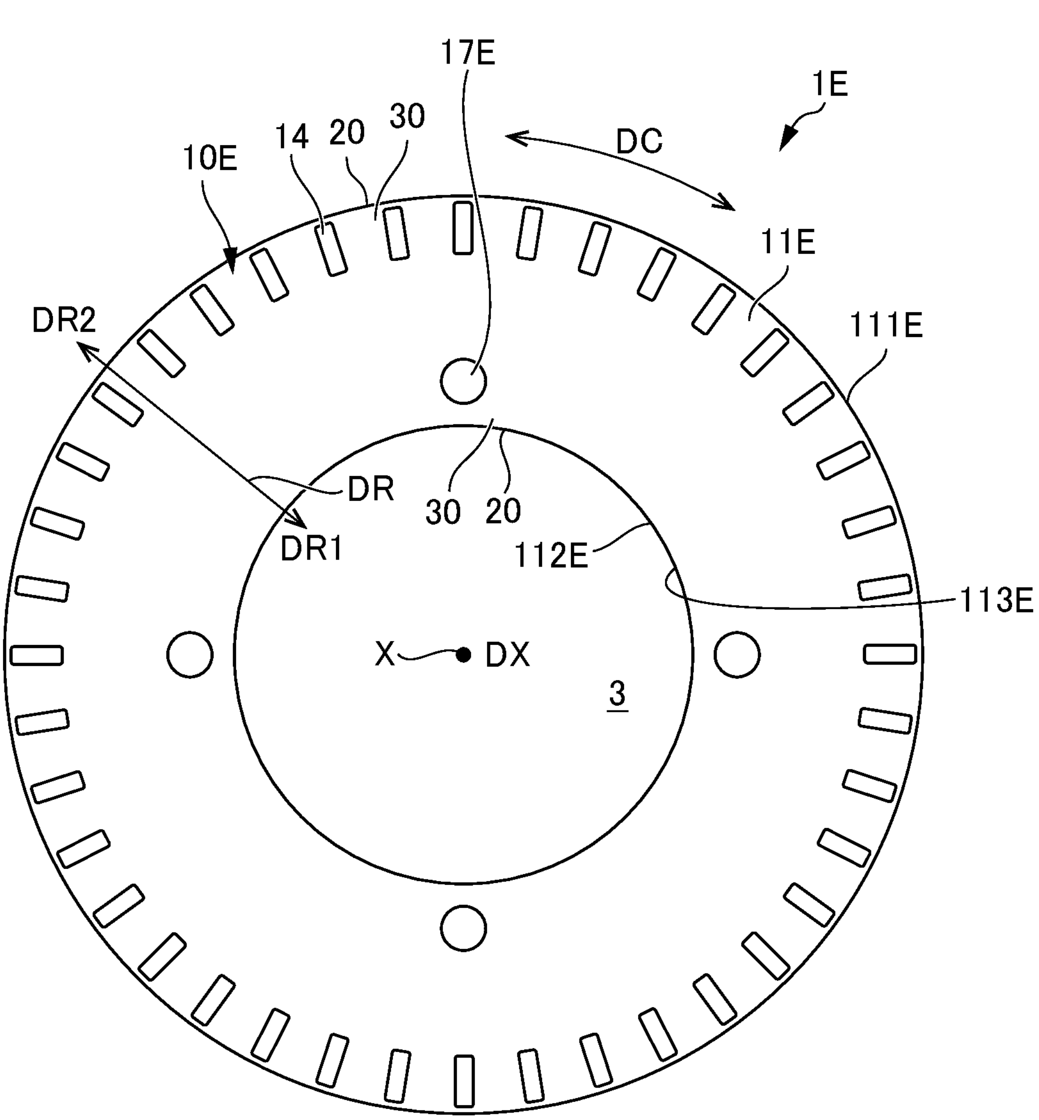
FIG. 12 is a plan view of a motor core block according to a fourth variation.

With reference to FIG. 12, description is given regarding a core block 1E that is for a motor and is according to a fourth variation. FIG. 12 is a plan view for the core block 1E.

Similarly to the core block 1B according to the first variation, the core block 1E is a rotor core that is for an induction motor and is configured by a plurality of approximately cylindrical electromagnetic steel sheets 10E being stacked. The core block 1E mainly differs from the core block 1B in that the electromagnetic steel sheets 10E have securing holes 17E.

Four securing holes 17E are provided on an inner peripheral surface 112E side (radially-inward direction DR1 side) of a core body 11E, and are disposed at intervals that are approximately equal to each other in the circumferential direction DC. A configuration other than the securing holes 17E is similar to that for the core block 1B according to the third variation, and description thereof is omitted.

[Fifth Variation]

Figure 13:
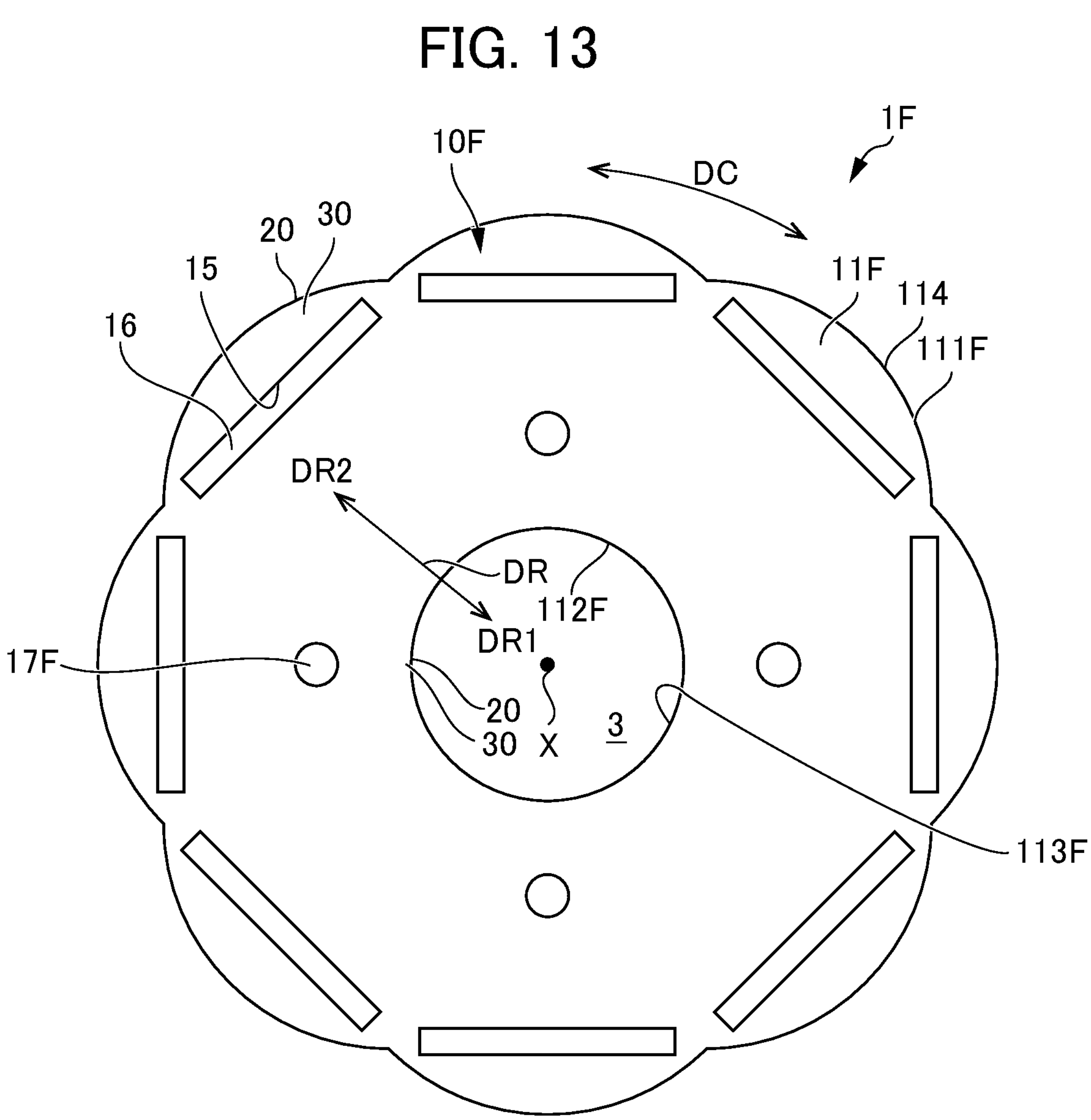
FIG. 13 is a plan view of a motor core block according to a fifth variation.
Figure 14:
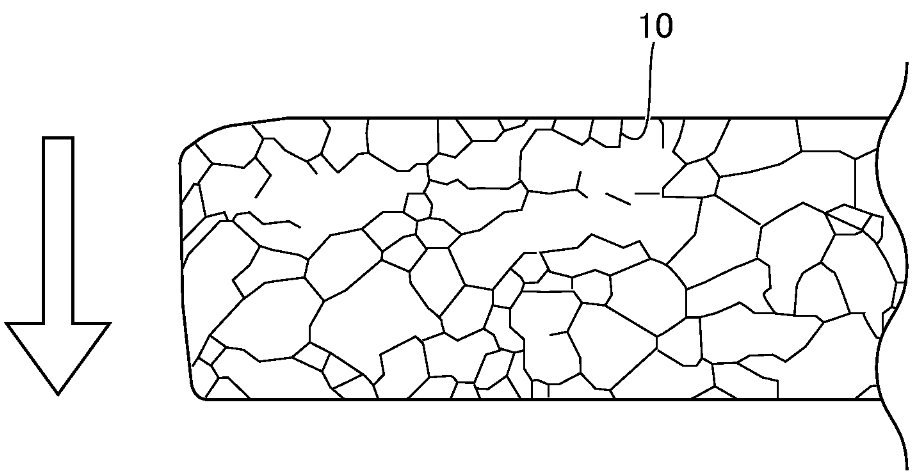
FIG. 14 is a cross-sectional view illustrating an electromagnetic steel sheet punched using press machining.

With reference to FIG. 13, description is given regarding a core block 1F that is for a motor and is according to a fifth variation. FIG. 13 is a plan view for the core block 1F.

Similarly to the core block 1C according to the fifth variation, the core block 1F is a rotor core that is for a servomotor and is configured by a plurality of approximately cylindrical electromagnetic steel sheets 10F being stacked. The core block 1F mainly differs from the core block 1C in that the electromagnetic steel sheets 10F have securing holes 17F.

Four securing holes 17F are provided on an inner peripheral surface 112F side (radially-inward direction DR1 side) of a core body 11F, and are disposed at intervals that are approximately equal to each other in the circumferential direction DC. Other features of the securing holes 17F are similar to that for the securing holes 17 according to the third variation, and description thereof is omitted.

The present disclosure is not limited to the embodiments and variations described above and can be modified, as appropriate. For example, a motor core (stator core, rotor core) may be configured by one core block, or may be configured by a plurality of core blocks. A plurality of core blocks may be arranged in the axial direction DX and/or the circumferential direction DC.

Edge formation machining is performed with respect to the teeth 12 in the electromagnetic steel sheets 10 in the first embodiment and the second embodiment, but edge formation machining may be performed with respect to the outer peripheral surface 111 on the electromagnetic steel sheets 10. As a result, dimensional accuracy improves for the outer peripheral surface 111 on the core block 1 to which the motor jacket 2 is fitted, and it becomes less likely for stress due to fitting with the motor jacket 2 to arise.

In the first variation, the second variation, the fourth variation, and the fifth variation, both of press machining and edge formation machining is performed on the electromagnetic steel sheets 10B, 10C, 10E, and 10F to thereby form the inner peripheral surfaces 112B, 112C, 112E, and 112F and the outer peripheral surfaces 111B, 111C, 111E, and 111F, but there is no limitation to this. It may be that only press machining is performed to form the inner peripheral surfaces 112B, 112C, 112E, and 112F. In addition, it may be that only edge formation machining is performed to form the inner peripheral surfaces 112B, 112C, 112E, and 112F and the outer peripheral surfaces 111B, 111C, 111E, and 111F.

EXPLANATION OF REFERENCE NUMERALS

1, 1A, 1B, 1C, 1D, 1E, 1F Core block
2 Motor jacket (mating member)
3 Shaft (mating member)
10, 10B, 10C, 10D, 10E Electromagnetic steel sheet
12 Tooth
20 Edge formation machining mark section
30, 30*a*, 30*b*, 30*c* Punching mark section
111 Outer peripheral surface of circular site
111B, 111C, 111E, 111F Outer peripheral surface
112B, 112C, 112E, 112F Inner peripheral surface of circular site
123 Tooth tip
127 Tooth edge
17, 17E, 17F Securing hole (hole)
DT Direction orthogonal to direction in which edges on electromagnetic steel sheet extend and thickness direction of the electromagnetic steel sheet

The invention claimed is:

1. A core block for a motor, the core block comprising stacked electromagnetic steel sheets, wherein the electromagnetic steel sheets are provided with an edge formation machining mark section formed by edge formation machining using electrical energy or optical energy, and a punching mark section formed by the electromagnetic steel sheets being punched using press machining, each of the edge formation machining mark section and the punching mark section being formed at some or an entire perimeter of an edge on the electromagnetic steel sheets, and the edge formation machining mark section and the punching mark section are not adjacent in a direction orthogonal to a direction in which the edge on the electromagnetic steel sheets extends and a thickness direction of the electromagnetic steel sheets.

2. The core block according to claim 1, wherein the edge formation machining mark section is formed on the electromagnetic steel sheets in a state where a plurality of the electromagnetic steel sheets are stacked and secured.

3. A method for producing a core block that is for a motor and includes stacked electromagnetic steel sheets, the method comprising:

edge formation machining using electrical energy or optical energy to form an entire perimeter of an edge on the electromagnetic steel sheets in the core block; and punching using press machining on the electromagnetic steel sheets after the edge formation machining using electrical energy or optical energy, wherein a site in the motor where the edge formation machining using electrical energy or optical energy is performed to form the entire perimeter of the edge on the electromagnetic steel sheets in the core block is an outer peripheral surface on a rotor core that is to be a gap section in the motor, or tooth tips in a stator core that are to be a gap section in the motor, and the punching is performed using the press machining to form some or the entire perimeter of the edge on the electromagnetic steel sheets in the core block at a portion in the electromagnetic steel sheets where the edge formation machining using electrical energy or optical energy has not been performed.

* * * * *